US012670246B2

(12) United States Patent
Hassey et al.

(10) Patent No.: US 12,670,246 B2
(45) Date of Patent: *Jun. 30, 2026

(54) FINE-GRAINED SECURITY POLICY ENFORCEMENT FOR APPLICATIONS

(71) Applicant: Delinea Inc., San Francisco, CA (US)

(72) Inventors: Philip David Hassey, Rye, CO (US); Yanran Zeng, Pittsburgh, PA (US); Brian David Rowe, Portland, OR (US); Kevin David Jamieson, North Vancouver (CA); Patrick David Stephen, Minneapolis, MN (US); Karim Fanous, Seattle, WA (US)

(73) Assignee: Delinea Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/335,531

(22) Filed: Sep. 22, 2025

(65) Prior Publication Data

US 2026/0093804 A1      Apr. 2, 2026

Related U.S. Application Data

(63) Continuation of application No. 19/063,742, filed on Feb. 26, 2025, now Pat. No. 12,423,418, which is a
(Continued)

(51) Int. Cl.
| | |
|---|---|
| *G06F 15/16* | (2006.01) |
| *G06F 21/54* | (2013.01) |
| *G06F 21/55* | (2013.01) |

(52) U.S. Cl.
CPC ............ *G06F 21/54* (2013.01); *G06F 21/554* (2013.01); *G06F 2221/033* (2013.01)

(58) Field of Classification Search
CPC ... G06F 21/54; G06F 21/554; G06F 2221/033
(Continued)

(56) References Cited

U.S. PATENT DOCUMENTS

| | | | |
|---|---|---|---|
| 5,867,494 | A | 2/1999 | Krishnaswamy et al. |
| 5,867,495 | A | 2/1999 | Elliott et al. |

(Continued)

FOREIGN PATENT DOCUMENTS

| | | |
|---|---|---|
| CA | 2847507 A1 | 11/2014 |
| EP | 3422236 B1 | 6/2022 |

OTHER PUBLICATIONS

Office Communication for U.S. Appl. No. 17/900,121 mailed Apr. 4, 2023, 13 Pages.
(Continued)

*Primary Examiner* — Moustafa M Meky
(74) *Attorney, Agent, or Firm* — John W. Branch; Branch Partners PLLC

(57) ABSTRACT

Embodiments obtain state elements based on application requests from a client. The state elements may be enqueued in a state queue associated with an application session for an application requests and the application requests may be forwarded to the application. Application responses from the application may be employed to perform further actions, including: obtaining message elements based on the application responses such that the message elements may be enqueued in a message queue associated in the application session; collecting a portion of the state elements in the state queue that may be associated the message elements; updating the portion of the state elements to advance a protocol state based on the message elements such that the application responses may be communicated to the client.

20 Claims, 13 Drawing Sheets

Related U.S. Application Data continuation of application No. 18/899,488, filed on Sep. 27, 2024, now Pat. No. 12,242,599.

(58) Field of Classification Search
USPC .......................................... 709/227, 217–219
See application file for complete search history.

(56) References Cited

U.S. PATENT DOCUMENTS

| | | | |
|---|---|---|---|
| 5,884,794 | A | 3/1999 | Calhoun et al. |
| 5,987,247 | A | 11/1999 | Lau |
| 6,335,927 | B1 | 1/2002 | Elliott et al. |
| 6,345,386 | B1 | 2/2002 | Delo et al. |
| 6,418,447 | B1 | 7/2002 | Frey et al. |
| 6,418,554 | B1 | 7/2002 | Delo et al. |
| 6,442,564 | B1 | 8/2002 | Frey et al. |
| 6,463,470 | B1 | 10/2002 | Mohaban et al. |
| 6,466,932 | B1 | 10/2002 | Dennis et al. |
| 6,502,103 | B1 | 12/2002 | Frey et al. |
| 6,505,210 | B1 | 1/2003 | Frey et al. |
| 6,523,166 | B1 | 2/2003 | Mishra et al. |
| 6,553,384 | B1 | 4/2003 | Frey et al. |
| 6,560,609 | B1 | 5/2003 | Frey et al. |
| 6,567,818 | B1 | 5/2003 | Frey et al. |
| 6,594,671 | B1 | 7/2003 | Aman et al. |
| 6,836,794 | B1 | 12/2004 | Lucovsky et al. |
| 6,909,708 | B1 | 6/2005 | Krishnaswamy et al. |
| 7,165,107 | B2 | 1/2007 | Pouyoul et al. |
| 7,174,361 | B1 | 2/2007 | Paas |
| 7,233,569 | B1 | 6/2007 | Swallow |
| 7,752,466 | B2 | 7/2010 | Ginter et al. |
| 7,752,487 | B1 | 7/2010 | Feeser et al. |
| 7,788,399 | B2 | 8/2010 | Brouk et al. |
| 7,797,406 | B2 | 9/2010 | Patel et al. |
| 7,882,247 | B2 | 2/2011 | Sturniolo et al. |
| 7,886,339 | B2 | 2/2011 | Keohane et al. |
| 8,102,814 | B2 | 1/2012 | Rahman et al. |
| 8,135,815 | B2 | 3/2012 | Mayer |
| 8,165,905 | B2 | 4/2012 | Yamamoto |
| 8,321,941 | B2 * | 11/2012 | Tuvell .................. G06F 16/245 726/24 |
| 8,656,154 | B1 | 2/2014 | Kailash et al. |
| 8,656,478 | B1 | 2/2014 | Forristal |
| 8,806,593 | B1 | 8/2014 | Raphel et al. |
| 8,817,668 | B2 | 8/2014 | Sekaran et al. |
| 8,869,259 | B1 | 10/2014 | Udupa et al. |
| 9,002,805 | B1 | 4/2015 | Barber et al. |
| 9,026,079 | B2 | 5/2015 | Raleigh et al. |
| 9,052,942 | B1 | 6/2015 | Barber et al. |
| 9,063,946 | B1 | 6/2015 | Barber et al. |
| 9,082,402 | B2 | 7/2015 | Yadgar et al. |
| 9,088,571 | B2 | 7/2015 | Bryan et al. |
| 9,176,758 | B2 | 11/2015 | Swaminathan |
| 9,178,793 | B1 | 11/2015 | Marlow |
| 9,185,082 | B2 | 11/2015 | Dashora et al. |
| 9,239,834 | B2 | 1/2016 | Donabedian et al. |
| 9,300,635 | B1 | 3/2016 | Gilde et al. |
| 9,344,509 | B1 | 5/2016 | Serboncini et al. |
| 9,355,060 | B1 | 5/2016 | Barber et al. |
| 9,369,433 | B1 | 6/2016 | Paul et al. |
| 9,380,456 | B1 | 6/2016 | Lee et al. |
| 9,380,523 | B1 | 6/2016 | Mijar et al. |
| 9,380,562 | B1 | 6/2016 | Vetter et al. |
| 9,417,917 | B1 | 8/2016 | Barber et al. |
| 9,471,775 | B1 | 10/2016 | Wagner et al. |
| 9,491,157 | B1 | 11/2016 | Amdahl et al. |
| 9,521,115 | B1 | 12/2016 | Woolward |
| 9,560,081 | B1 | 1/2017 | Woolward |
| 9,578,052 | B2 * | 2/2017 | CP ......................... H04L 63/20 |
| 9,584,523 | B2 | 2/2017 | Santhiveeran |
| 9,619,673 | B1 | 4/2017 | Vetter et al. |
| 9,632,828 | B1 | 4/2017 | Mehta et al. |
| 9,658,983 | B1 | 5/2017 | Barber et al. |
| 9,667,703 | B1 | 5/2017 | Vetter et al. |
| 9,697,629 | B1 | 7/2017 | Vetter et al. |
| 9,727,522 | B1 | 8/2017 | Barber et al. |
| 9,729,581 | B1 | 8/2017 | Skene et al. |
| 9,762,619 | B1 | 9/2017 | Vaidya et al. |
| 9,787,639 | B1 | 10/2017 | Sun et al. |
| 9,800,517 | B1 | 10/2017 | Anderson |
| 9,819,593 | B1 | 11/2017 | Vetter et al. |
| 9,825,911 | B1 | 11/2017 | Brandwine |
| 9,882,767 | B1 | 1/2018 | Foxhoven et al. |
| 9,948,644 | B2 | 4/2018 | Brouk et al. |
| 10,033,766 | B2 | 7/2018 | Gupta et al. |
| 10,063,595 | B1 | 8/2018 | Qureshi et al. |
| 10,075,334 | B1 | 9/2018 | Kozura et al. |
| 10,089,476 | B1 | 10/2018 | Roth et al. |
| 10,104,185 | B1 | 10/2018 | Sharifi et al. |
| 10,110,593 | B2 | 10/2018 | Karroumi et al. |
| 10,116,679 | B1 | 10/2018 | Wu et al. |
| 10,117,098 | B1 | 10/2018 | Naguthanawala et al. |
| 10,154,065 | B1 | 12/2018 | Buchler et al. |
| 10,158,545 | B1 | 12/2018 | Marrone et al. |
| 10,205,743 | B2 * | 2/2019 | Cp ...................... H04L 63/1408 |
| 10,292,033 | B2 | 5/2019 | Beyer et al. |
| 10,348,767 | B1 | 7/2019 | Lee et al. |
| 10,360,010 | B1 | 7/2019 | Maehler et al. |
| 10,361,859 | B2 | 7/2019 | Clark et al. |
| 10,382,401 | B1 | 8/2019 | Lee et al. |
| 10,395,042 | B2 | 8/2019 | Agarwal et al. |
| 10,409,582 | B1 | 9/2019 | Maehler et al. |
| 10,454,975 | B1 | 10/2019 | Sharifi Mehr |
| 10,476,745 | B1 | 11/2019 | McCormick et al. |
| 10,505,989 | B2 | 12/2019 | Hankins et al. |
| 10,511,590 | B1 | 12/2019 | Bosch et al. |
| 10,511,614 | B1 | 12/2019 | Aziz |
| 10,516,667 | B1 | 12/2019 | Roth et al. |
| 10,579,362 | B1 | 3/2020 | Maehler et al. |
| 10,579,403 | B2 | 3/2020 | Antony et al. |
| 10,587,621 | B2 | 3/2020 | Ponnuswamy et al. |
| 10,587,644 | B1 | 3/2020 | Stolte et al. |
| 10,609,041 | B1 | 3/2020 | Wilczynski et al. |
| 10,645,115 | B2 * | 5/2020 | C P ...................... H04L 63/1408 |
| 10,645,562 | B2 | 5/2020 | Beyer et al. |
| 10,659,533 | B1 | 5/2020 | Zhao et al. |
| 10,728,117 | B1 | 7/2020 | Sharma et al. |
| 10,735,263 | B1 | 8/2020 | Mcalary et al. |
| 10,764,244 | B1 | 9/2020 | Mestery et al. |
| 10,827,020 | B1 | 11/2020 | Cao et al. |
| 10,917,438 | B2 | 2/2021 | Gandham et al. |
| 10,944,561 | B1 | 3/2021 | Cahill et al. |
| 10,944,691 | B1 | 3/2021 | Raut et al. |
| 10,958,649 | B2 | 3/2021 | Delcourt et al. |
| 10,999,326 | B1 | 5/2021 | Pollitt et al. |
| 11,038,861 | B2 | 6/2021 | Agarwal et al. |
| 11,070,594 | B1 | 7/2021 | Marrone et al. |
| 11,075,747 | B1 | 7/2021 | Holsman |
| 11,075,923 | B1 | 7/2021 | Srinivasan et al. |
| 11,089,047 | B1 | 8/2021 | Kaushal et al. |
| 11,102,076 | B1 | 8/2021 | Pieczul et al. |
| 11,102,147 | B2 | 8/2021 | Mehta et al. |
| 11,153,190 | B1 | 10/2021 | Mahajan et al. |
| 11,163,614 | B1 | 11/2021 | Francisco |
| 11,165,783 | B1 | 11/2021 | Eiers et al. |
| 11,171,984 | B2 * | 11/2021 | CP ....................... H04L 63/145 |
| 11,228,945 | B2 | 1/2022 | Yang et al. |
| 11,233,872 | B2 | 1/2022 | Shribman et al. |
| 11,249,809 | B1 | 2/2022 | Tang et al. |
| 11,290,143 | B1 | 3/2022 | Sternowski |
| 11,303,643 | B1 | 4/2022 | Li et al. |
| 11,310,650 | B2 | 4/2022 | Zhau |
| 11,316,822 | B1 | 4/2022 | Gawade et al. |
| 11,323,919 | B1 | 5/2022 | Parulkar et al. |
| 11,375,300 | B2 | 6/2022 | Sagie et al. |
| 11,412,051 | B1 | 8/2022 | Chiganmi et al. |
| 11,424,946 | B2 | 8/2022 | Shribman et al. |
| 11,431,497 | B1 | 8/2022 | Liguori et al. |
| 11,483,308 | B2 | 10/2022 | Kale et al. |
| 11,502,908 | B1 | 11/2022 | Singh |
| 11,521,444 | B1 | 12/2022 | Badik et al. |
| 11,528,147 | B2 | 12/2022 | Madisetti et al. |
| 11,538,287 | B2 | 12/2022 | Fang et al. |
| 11,546,323 | B1 | 1/2023 | Jones et al. |

(56) References Cited

U.S. PATENT DOCUMENTS

| | | |
|---|---|---|
| 11,546,763 B1 | 1/2023 | Filho et al. |
| 11,599,714 B2 | 3/2023 | Munro et al. |
| 11,599,841 B2 | 3/2023 | Anisingaraju et al. |
| 11,620,103 B2 | 4/2023 | Graham et al. |
| 11,632,669 B2 | 4/2023 | Xu et al. |
| 11,657,145 B2 | 5/2023 | Cristina et al. |
| 11,729,620 B1 | 8/2023 | Filho et al. |
| 11,736,531 B1 | 8/2023 | Filho et al. |
| 11,765,159 B1 | 9/2023 | Crawford et al. |
| 11,765,207 B1 | 9/2023 | McCarthy et al. |
| 11,784,999 B1 | 10/2023 | Jones et al. |
| 11,831,511 B1 | 11/2023 | Zhou et al. |
| 11,861,221 B1 | 1/2024 | Richardson et al. |
| 11,916,885 B1 | 2/2024 | Cirello Filho et al. |
| 11,916,968 B1 | 2/2024 | Cirello Filho et al. |
| 11,930,045 B1 | 3/2024 | Baker et al. |
| 11,936,693 B2 | 3/2024 | Reznik et al. |
| 11,954,219 B1 | 4/2024 | Makmal et al. |
| 11,973,752 B2 | 4/2024 | Crawford et al. |
| 12,028,321 B1 | 7/2024 | Cirello Filho et al. |
| 12,063,148 B2 | 8/2024 | Dabell et al. |
| 12,063,218 B2 | 8/2024 | Wilczynski et al. |
| 12,063,550 B2 | 8/2024 | Qiao et al. |
| 12,132,735 B1 | 10/2024 | Razavi et al. |
| 12,177,097 B2 | 12/2024 | Gupta et al. |
| 12,184,667 B2 | 12/2024 | Chacko |
| 12,184,700 B2 | 12/2024 | Raleigh |
| 12,238,119 B1 | 2/2025 | Chivu et al. |
| 12,242,599 B1* | 3/2025 | Hassey ........... G06F 21/554 |
| 12,277,224 B1* | 4/2025 | Nazari ........... G06F 9/4881 |
| 12,277,410 B1* | 4/2025 | Nazari ........... G06F 9/541 |
| 12,284,224 B1 | 4/2025 | Cirello Filho et al. |
| 12,307,291 B1* | 5/2025 | Nazari ........... G06F 9/4881 |
| 12,348,519 B1 | 7/2025 | Hassey et al. |
| 12,355,770 B2 | 7/2025 | Cirello Filho et al. |
| 12,405,773 B1* | 9/2025 | Nazari ........... G06F 9/541 |
| 12,423,418 B1* | 9/2025 | Hassey ........... G06F 21/54 |
| 12,432,242 B1 | 9/2025 | McCarthy et al. |
| 2002/0099952 A1 | 7/2002 | Lambert et al. |
| 2002/0124144 A1 | 9/2002 | Gharachorloo et al. |
| 2002/0133534 A1 | 9/2002 | Forslow |
| 2002/0140738 A1 | 10/2002 | West et al. |
| 2002/0149623 A1 | 10/2002 | West et al. |
| 2003/0041141 A1 | 2/2003 | Abdelaziz et al. |
| 2003/0058286 A1 | 3/2003 | Dando |
| 2003/0093465 A1 | 5/2003 | Banerjee et al. |
| 2003/0145317 A1 | 7/2003 | Chamberlain |
| 2003/0177182 A1 | 9/2003 | Clark et al. |
| 2004/0019898 A1 | 1/2004 | Frey et al. |
| 2004/0064512 A1 | 4/2004 | Arora et al. |
| 2004/0064568 A1 | 4/2004 | Arora et al. |
| 2004/0064693 A1 | 4/2004 | Pabla et al. |
| 2004/0088348 A1 | 5/2004 | Yeager et al. |
| 2004/0133640 A1 | 7/2004 | Yeager et al. |
| 2004/0184070 A1 | 9/2004 | Kiraly et al. |
| 2005/0022185 A1 | 1/2005 | Romero |
| 2005/0132227 A1 | 6/2005 | Reasor et al. |
| 2005/0164650 A1 | 7/2005 | Johnson |
| 2005/0209876 A1 | 9/2005 | Kennis et al. |
| 2006/0074876 A1 | 4/2006 | Kakivaya et al. |
| 2006/0136928 A1 | 6/2006 | Crawford et al. |
| 2006/0177005 A1 | 8/2006 | Shaffer et al. |
| 2006/0177024 A1 | 8/2006 | Frifeldt et al. |
| 2006/0177025 A1 | 8/2006 | Frifeldt et al. |
| 2006/0190991 A1 | 8/2006 | Iyer |
| 2006/0200856 A1 | 9/2006 | Salowey et al. |
| 2006/0212487 A1 | 9/2006 | Kennis et al. |
| 2006/0233166 A1 | 10/2006 | Bou-Diab et al. |
| 2006/0233180 A1 | 10/2006 | Serghi et al. |
| 2006/0235973 A1 | 10/2006 | McBride et al. |
| 2006/0240824 A1 | 10/2006 | Henderson et al. |
| 2006/0265708 A1 | 11/2006 | Blanding et al. |
| 2006/0265758 A1 | 11/2006 | Khandelwal et al. |
| 2006/0288204 A1 | 12/2006 | Sood et al. |
| 2007/0009104 A1 | 1/2007 | Renkis |
| 2007/0014413 A1 | 1/2007 | Oliveira et al. |
| 2007/0033273 A1 | 2/2007 | White et al. |
| 2007/0124797 A1 | 5/2007 | Gupta et al. |
| 2007/0162359 A1 | 7/2007 | Gokhale et al. |
| 2007/0220009 A1 | 9/2007 | Morris et al. |
| 2007/0293210 A1 | 12/2007 | Strub et al. |
| 2007/0294209 A1 | 12/2007 | Strub et al. |
| 2007/0294253 A1 | 12/2007 | Strub et al. |
| 2008/0072281 A1 | 3/2008 | Willis et al. |
| 2008/0072282 A1 | 3/2008 | Willis et al. |
| 2008/0082823 A1 | 4/2008 | Starrett et al. |
| 2008/0144502 A1 | 6/2008 | Jackowski et al. |
| 2008/0184336 A1 | 7/2008 | Sarukkai et al. |
| 2008/0201454 A1 | 8/2008 | Soffer |
| 2008/0229383 A1 | 9/2008 | Buss et al. |
| 2008/0256357 A1 | 10/2008 | Iyengar et al. |
| 2008/0313699 A1 | 12/2008 | Starostin et al. |
| 2009/0037607 A1 | 2/2009 | Farinacci et al. |
| 2009/0049509 A1 | 2/2009 | Chan et al. |
| 2009/0063381 A1 | 3/2009 | Chan et al. |
| 2009/0083336 A1 | 3/2009 | Srinivasan |
| 2009/0164663 A1 | 6/2009 | Ransom et al. |
| 2009/0216910 A1 | 8/2009 | Duchesneau |
| 2009/0222559 A1 | 9/2009 | Anipko et al. |
| 2010/0037311 A1 | 2/2010 | He et al. |
| 2010/0053676 A1 | 3/2010 | Sugimoto |
| 2010/0131650 A1 | 5/2010 | Pok et al. |
| 2010/0132013 A1 | 5/2010 | Van et al. |
| 2010/0154025 A1 | 6/2010 | Esteve et al. |
| 2010/0161632 A1 | 6/2010 | Rosen |
| 2010/0192212 A1 | 7/2010 | Raleigh |
| 2010/0217853 A1 | 8/2010 | Alexander et al. |
| 2010/0250497 A1 | 9/2010 | Redlich et al. |
| 2010/0262717 A1 | 10/2010 | Critchley et al. |
| 2011/0002333 A1 | 1/2011 | Karuppiah et al. |
| 2011/0106757 A1 | 5/2011 | Pickney et al. |
| 2011/0106770 A1 | 5/2011 | McDonald et al. |
| 2011/0106771 A1 | 5/2011 | McDonald et al. |
| 2011/0106802 A1 | 5/2011 | Pickney et al. |
| 2011/0154027 A1 | 6/2011 | Liu et al. |
| 2011/0167474 A1 | 7/2011 | Sinha et al. |
| 2011/0225311 A1 | 9/2011 | Liu et al. |
| 2012/0084438 A1 | 4/2012 | Raleigh et al. |
| 2012/0102050 A1 | 4/2012 | Button et al. |
| 2012/0131469 A1 | 5/2012 | Yamuna et al. |
| 2012/0185913 A1 | 7/2012 | Martinez et al. |
| 2012/0216240 A1 | 8/2012 | Gottumukkala et al. |
| 2012/0240183 A1 | 9/2012 | Sinha |
| 2012/0260307 A1 | 10/2012 | Sambamurthy et al. |
| 2012/0278293 A1 | 11/2012 | Bulkowski et al. |
| 2012/0304265 A1 | 11/2012 | Richter et al. |
| 2013/0031157 A1 | 1/2013 | Mckee et al. |
| 2013/0125112 A1 | 5/2013 | Mittal et al. |
| 2013/0173794 A1 | 7/2013 | Agerbak et al. |
| 2013/0198558 A1 | 8/2013 | Rao et al. |
| 2013/0227714 A1 | 8/2013 | Gula et al. |
| 2013/0239192 A1 | 9/2013 | Linga et al. |
| 2013/0254535 A1 | 9/2013 | Akehurst et al. |
| 2013/0268260 A1 | 10/2013 | Lundberg et al. |
| 2013/0268740 A1 | 10/2013 | Holt |
| 2013/0298183 A1 | 11/2013 | McGrath et al. |
| 2014/0044265 A1 | 2/2014 | Kocher et al. |
| 2014/0057676 A1 | 2/2014 | Lord et al. |
| 2014/0115693 A1 | 4/2014 | Schieman et al. |
| 2014/0136970 A1 | 5/2014 | Xiao |
| 2014/0183269 A1 | 7/2014 | Glaser |
| 2014/0195818 A1 | 7/2014 | Neumann et al. |
| 2014/0201520 A1 | 7/2014 | Yacobi |
| 2014/0248852 A1 | 9/2014 | Raleigh et al. |
| 2014/0282900 A1 | 9/2014 | Wang et al. |
| 2014/0289794 A1 | 9/2014 | Raleigh et al. |
| 2014/0373124 A1 | 12/2014 | Rubin et al. |
| 2014/0376378 A1 | 12/2014 | Rubin et al. |
| 2015/0063202 A1 | 3/2015 | Mazzarella et al. |
| 2015/0079945 A1 | 3/2015 | Rubin et al. |
| 2015/0082016 A1 | 3/2015 | Bonczkowski et al. |
| 2015/0082374 A1 | 3/2015 | Dobson et al. |
| 2015/0089566 A1 | 3/2015 | Chesla |
| 2015/0089575 A1 | 3/2015 | Vepa et al. |

(56) References Cited

U.S. PATENT DOCUMENTS

| | | |
|---|---|---|
| 2015/0121449 A1* | 4/2015 | CP .................... G06F 21/566 726/1 |
| 2015/0127949 A1 | 5/2015 | Patil et al. |
| 2015/0128205 A1 | 5/2015 | Mahaffey et al. |
| 2015/0135277 A1 | 5/2015 | Vij et al. |
| 2015/0135300 A1 | 5/2015 | Ford |
| 2015/0143456 A1 | 5/2015 | Raleigh et al. |
| 2015/0143504 A1 | 5/2015 | Desai et al. |
| 2015/0156194 A1 | 6/2015 | Modi et al. |
| 2015/0169871 A1 | 6/2015 | Achutha et al. |
| 2015/0188949 A1 | 7/2015 | Mahaffey et al. |
| 2015/0208273 A1 | 7/2015 | Raleigh et al. |
| 2015/0281079 A1 | 10/2015 | Fan et al. |
| 2015/0281952 A1 | 10/2015 | Patil et al. |
| 2015/0282058 A1 | 10/2015 | Forssell |
| 2015/0301824 A1 | 10/2015 | Patton et al. |
| 2015/0309849 A1 | 10/2015 | Lau et al. |
| 2015/0310025 A1 | 10/2015 | Rathgeber et al. |
| 2015/0319182 A1 | 11/2015 | Natarajan et al. |
| 2015/0326613 A1 | 11/2015 | Devarajan et al. |
| 2015/0350912 A1 | 12/2015 | Head et al. |
| 2015/0370793 A1 | 12/2015 | Chen et al. |
| 2015/0370846 A1 | 12/2015 | Zhau |
| 2015/0382198 A1 | 12/2015 | Kashef et al. |
| 2016/0014669 A1 | 1/2016 | Patil et al. |
| 2016/0014818 A1 | 1/2016 | Reitsma et al. |
| 2016/0036816 A1 | 2/2016 | Srinivasan |
| 2016/0036855 A1 | 2/2016 | Gangadharappa et al. |
| 2016/0036861 A1 | 2/2016 | Mattes et al. |
| 2016/0057166 A1 | 2/2016 | Chesla |
| 2016/0065618 A1 | 3/2016 | Banerjee |
| 2016/0078236 A1 | 3/2016 | Chesla |
| 2016/0080128 A1 | 3/2016 | Hebron |
| 2016/0085841 A1 | 3/2016 | Dorfman et al. |
| 2016/0147529 A1 | 5/2016 | Coleman et al. |
| 2016/0173501 A1 | 6/2016 | Brown |
| 2016/0180102 A1 | 6/2016 | Kim et al. |
| 2016/0191545 A1 | 6/2016 | Nanda et al. |
| 2016/0212237 A1 | 7/2016 | Nishijima |
| 2016/0219024 A1 | 7/2016 | Verzun et al. |
| 2016/0224360 A1 | 8/2016 | Wagner et al. |
| 2016/0224785 A1 | 8/2016 | Wagner et al. |
| 2016/0255051 A1 | 9/2016 | Williams et al. |
| 2016/0262021 A1 | 9/2016 | Lee et al. |
| 2016/0277447 A1 | 9/2016 | Pope et al. |
| 2016/0294826 A1 | 10/2016 | Han et al. |
| 2016/0314355 A1 | 10/2016 | Laska et al. |
| 2016/0337474 A1 | 11/2016 | Rao |
| 2016/0359872 A1 | 12/2016 | Yadav et al. |
| 2016/0359914 A1 | 12/2016 | Deen et al. |
| 2016/0378846 A1 | 12/2016 | Luse et al. |
| 2016/0380909 A1 | 12/2016 | Antony et al. |
| 2016/0381699 A1 | 12/2016 | Rubin et al. |
| 2017/0005790 A1 | 1/2017 | Brockmann et al. |
| 2017/0010826 A1 | 1/2017 | Basham et al. |
| 2017/0011078 A1 | 1/2017 | Gerrard et al. |
| 2017/0061006 A1 | 3/2017 | Hildebrand et al. |
| 2017/0061956 A1 | 3/2017 | Sarikaya et al. |
| 2017/0075598 A1* | 3/2017 | Sofia .................... G06F 3/0619 |
| 2017/0078721 A1 | 3/2017 | Brockmann et al. |
| 2017/0093923 A1 | 3/2017 | Duan |
| 2017/0103440 A1 | 4/2017 | Xing et al. |
| 2017/0111368 A1 | 4/2017 | Hibbert et al. |
| 2017/0118228 A1* | 4/2017 | CP .................... G06F 21/566 |
| 2017/0126734 A1 | 5/2017 | Harney |
| 2017/0134422 A1 | 5/2017 | Shieh |
| 2017/0142096 A1 | 5/2017 | Reddy et al. |
| 2017/0142810 A1 | 5/2017 | Cho |
| 2017/0149614 A1 | 5/2017 | Zheng et al. |
| 2017/0149843 A1 | 5/2017 | Amulothu et al. |
| 2017/0171154 A1 | 6/2017 | Brown et al. |
| 2017/0171245 A1 | 6/2017 | Lee et al. |
| 2017/0177222 A1 | 6/2017 | Singh et al. |
| 2017/0177892 A1 | 6/2017 | Tingstrom et al. |
| 2017/0206207 A1 | 7/2017 | Bondurant et al. |
| 2017/0212830 A1 | 7/2017 | Thomas et al. |
| 2017/0223024 A1 | 8/2017 | Desai et al. |
| 2017/0237747 A1 | 8/2017 | Quinn et al. |
| 2017/0244606 A1 | 8/2017 | Htay |
| 2017/0250953 A1 | 8/2017 | Jain et al. |
| 2017/0257357 A1 | 9/2017 | Wang et al. |
| 2017/0279803 A1 | 9/2017 | Desai et al. |
| 2017/0279971 A1 | 9/2017 | Raleigh et al. |
| 2017/0331859 A1 | 11/2017 | Bansal et al. |
| 2017/0332238 A1 | 11/2017 | Bansal et al. |
| 2017/0339561 A1 | 11/2017 | Wennemyr et al. |
| 2017/0353433 A1 | 12/2017 | Antony et al. |
| 2017/0353483 A1 | 12/2017 | Weith et al. |
| 2017/0353496 A1 | 12/2017 | Pai et al. |
| 2017/0359220 A1 | 12/2017 | Weith et al. |
| 2017/0364505 A1 | 12/2017 | Sarikaya et al. |
| 2017/0364748 A1 | 12/2017 | Maji et al. |
| 2017/0372087 A1 | 12/2017 | Lee |
| 2017/0374032 A1 | 12/2017 | Woolward et al. |
| 2017/0374090 A1 | 12/2017 | McGrew et al. |
| 2017/0374101 A1 | 12/2017 | Woolward |
| 2018/0027009 A1 | 1/2018 | Santos et al. |
| 2018/0032258 A1 | 2/2018 | Edwards et al. |
| 2018/0035126 A1 | 2/2018 | Lee et al. |
| 2018/0041467 A1 | 2/2018 | Vats et al. |
| 2018/0041598 A1 | 2/2018 | Vats et al. |
| 2018/0061158 A1 | 3/2018 | Greene |
| 2018/0069702 A1 | 3/2018 | Ayyadevara et al. |
| 2018/0083915 A1 | 3/2018 | Medam et al. |
| 2018/0083944 A1 | 3/2018 | Vats et al. |
| 2018/0091583 A1 | 3/2018 | Collins et al. |
| 2018/0101422 A1 | 4/2018 | Flanigan et al. |
| 2018/0109498 A1 | 4/2018 | Singh |
| 2018/0115520 A1 | 4/2018 | Neuman et al. |
| 2018/0115523 A1 | 4/2018 | Subbarayan et al. |
| 2018/0115585 A1 | 4/2018 | Rubakha |
| 2018/0121110 A1 | 5/2018 | Sawhney |
| 2018/0121129 A1 | 5/2018 | Sawhney et al. |
| 2018/0123957 A1 | 5/2018 | Chen et al. |
| 2018/0159701 A1 | 6/2018 | Krause et al. |
| 2018/0167373 A1 | 6/2018 | Anderson et al. |
| 2018/0167397 A1 | 6/2018 | Zhang |
| 2018/0167415 A1 | 6/2018 | Khan et al. |
| 2018/0176262 A1 | 6/2018 | Kavi |
| 2018/0196680 A1 | 7/2018 | Wang et al. |
| 2018/0210801 A1 | 7/2018 | Wu et al. |
| 2018/0218148 A1 | 8/2018 | D'errico et al. |
| 2018/0218149 A1 | 8/2018 | Jacobs et al. |
| 2018/0220472 A1 | 8/2018 | Schopp |
| 2018/0233141 A1 | 8/2018 | Solomon et al. |
| 2018/0255591 A1 | 9/2018 | Valicherla et al. |
| 2018/0270732 A1 | 9/2018 | Garcia et al. |
| 2018/0288026 A1 | 10/2018 | Callaghan |
| 2018/0293024 A1 | 10/2018 | Baptist et al. |
| 2018/0295036 A1 | 10/2018 | Krishnamurthy et al. |
| 2018/0309764 A1 | 10/2018 | Kras et al. |
| 2018/0314846 A1 | 11/2018 | Schultz et al. |
| 2018/0316725 A1 | 11/2018 | Mani et al. |
| 2018/0341519 A1 | 11/2018 | Vyas et al. |
| 2018/0343238 A1 | 11/2018 | Tola |
| 2018/0343256 A1 | 11/2018 | Boodaei |
| 2018/0349629 A1 | 12/2018 | Chenchev et al. |
| 2018/0359369 A1 | 12/2018 | Golshenas et al. |
| 2018/0367308 A1 | 12/2018 | Kacin et al. |
| 2018/0367396 A1 | 12/2018 | Kompella et al. |
| 2019/0020665 A1 | 1/2019 | Surcouf et al. |
| 2019/0039569 A1 | 2/2019 | Reed et al. |
| 2019/0052554 A1 | 2/2019 | Mukerji et al. |
| 2019/0058709 A1 | 2/2019 | Kempf et al. |
| 2019/0065278 A1 | 2/2019 | Jeuk et al. |
| 2019/0068449 A1 | 2/2019 | Sikand et al. |
| 2019/0073373 A1 | 3/2019 | Surale et al. |
| 2019/0075095 A1 | 3/2019 | Venable et al. |
| 2019/0081955 A1 | 3/2019 | Chugtu et al. |
| 2019/0095655 A1 | 3/2019 | Krawczewicz et al. |
| 2019/0104411 A1 | 4/2019 | Hotchkiss et al. |
| 2019/0109713 A1 | 4/2019 | Clark et al. |
| 2019/0116132 A1 | 4/2019 | Suzuki |
| 2019/0124507 A1 | 4/2019 | Dotchkoff et al. |

(56) References Cited

U.S. PATENT DOCUMENTS

| | | |
|---|---|---|
| 2019/0147154 A1 | 5/2019 | Das |
| 2019/0149417 A1 | 5/2019 | Augusto et al. |
| 2019/0149429 A1 | 5/2019 | Stöcker |
| 2019/0156023 A1 | 5/2019 | Gerebe et al. |
| 2019/0158503 A1 | 5/2019 | Bansal et al. |
| 2019/0163406 A1 | 5/2019 | Kazi et al. |
| 2019/0173891 A1* | 6/2019 | CP ................... H04L 63/145 |
| 2019/0174449 A1 | 6/2019 | Shan et al. |
| 2019/0213319 A1 | 7/2019 | Gerebe et al. |
| 2019/0215694 A1 | 7/2019 | Rubin et al. |
| 2019/0235605 A1 | 8/2019 | Chenchev et al. |
| 2019/0245862 A1 | 8/2019 | Kruse et al. |
| 2019/0253274 A1 | 8/2019 | Van Dussen |
| 2019/0254094 A1 | 8/2019 | Babu et al. |
| 2019/0258813 A1 | 8/2019 | Lewis et al. |
| 2019/0260753 A1 | 8/2019 | Lewis et al. |
| 2019/0261203 A1 | 8/2019 | Raleigh |
| 2019/0268167 A1 | 8/2019 | White et al. |
| 2019/0281073 A1 | 9/2019 | Weith et al. |
| 2019/0281127 A1 | 9/2019 | Schmidt et al. |
| 2019/0289459 A1 | 9/2019 | Shan et al. |
| 2019/0297161 A1 | 9/2019 | Ayyadevara et al. |
| 2019/0303345 A1 | 10/2019 | Zhu et al. |
| 2019/0306754 A1 | 10/2019 | Shan et al. |
| 2019/0313359 A1 | 10/2019 | Lee et al. |
| 2019/0317821 A1 | 10/2019 | O'Neal et al. |
| 2019/0318240 A1 | 10/2019 | Kulkarni et al. |
| 2019/0319950 A1 | 10/2019 | Bowling |
| 2019/0327320 A1 | 10/2019 | Rubin et al. |
| 2019/0332777 A1 | 10/2019 | Edwards et al. |
| 2019/0340341 A1 | 11/2019 | Fleck et al. |
| 2019/0349742 A1 | 11/2019 | Kim et al. |
| 2019/0349758 A1 | 11/2019 | Zhu et al. |
| 2019/0386969 A1 | 12/2019 | Verzun et al. |
| 2020/0004451 A1 | 1/2020 | Prohofsky |
| 2020/0007540 A1 | 1/2020 | Kawaguchi et al. |
| 2020/0021615 A1 | 1/2020 | Wainner et al. |
| 2020/0026850 A1 | 1/2020 | Levin et al. |
| 2020/0034248 A1 | 1/2020 | Nara et al. |
| 2020/0067801 A1 | 2/2020 | McCormick et al. |
| 2020/0077265 A1 | 3/2020 | Singh et al. |
| 2020/0089516 A1 | 3/2020 | Vijayvargiya et al. |
| 2020/0097195 A1 | 3/2020 | Fritz et al. |
| 2020/0112850 A1 | 4/2020 | Lee et al. |
| 2020/0153911 A1 | 5/2020 | Chauhan |
| 2020/0177333 A1 | 6/2020 | Liu |
| 2020/0193016 A1 | 6/2020 | Zeng et al. |
| 2020/0204551 A1 | 6/2020 | Singh et al. |
| 2020/0205209 A1 | 6/2020 | Pan et al. |
| 2020/0214054 A1 | 7/2020 | Qiao et al. |
| 2020/0218798 A1 | 7/2020 | Kosaka et al. |
| 2020/0219023 A1 | 7/2020 | Duchastel |
| 2020/0220848 A1 | 7/2020 | Patwardhan |
| 2020/0220875 A1 | 7/2020 | Harguindeguy et al. |
| 2020/0228546 A1* | 7/2020 | CP ................... H04L 63/1408 |
| 2020/0228936 A1 | 7/2020 | Talebi et al. |
| 2020/0229069 A1 | 7/2020 | Chun |
| 2020/0242493 A1 | 7/2020 | Botea et al. |
| 2020/0257179 A1 | 8/2020 | Barnum et al. |
| 2020/0257810 A1 | 8/2020 | Vrabec et al. |
| 2020/0259831 A1 | 8/2020 | Pampati et al. |
| 2020/0260401 A1 | 8/2020 | So |
| 2020/0267552 A1 | 8/2020 | Lee et al. |
| 2020/0267554 A1 | 8/2020 | Faccin et al. |
| 2020/0267785 A1 | 8/2020 | Talebi et al. |
| 2020/0272911 A1 | 8/2020 | Quiros Araya et al. |
| 2020/0280592 A1 | 9/2020 | Ithal et al. |
| 2020/0296619 A1 | 9/2020 | Pan et al. |
| 2020/0296779 A1 | 9/2020 | Moghe et al. |
| 2020/0304474 A1 | 9/2020 | Kisko et al. |
| 2020/0314127 A1 | 10/2020 | Wilson et al. |
| 2020/0314613 A1 | 10/2020 | Lee et al. |
| 2020/0314701 A1 | 10/2020 | Talebi et al. |
| 2020/0320189 A1 | 10/2020 | Zhang et al. |
| 2020/0322262 A1 | 10/2020 | Maino et al. |
| 2020/0322286 A1 | 10/2020 | Mehta et al. |
| 2020/0323030 A1 | 10/2020 | Mehta et al. |
| 2020/0334084 A1 | 10/2020 | Jacobson |
| 2020/0336484 A1 | 10/2020 | Mahajan et al. |
| 2020/0344637 A1 | 10/2020 | Kim et al. |
| 2020/0351699 A1 | 11/2020 | Pan et al. |
| 2020/0351980 A1 | 11/2020 | Talebi et al. |
| 2020/0351984 A1 | 11/2020 | Talebi et al. |
| 2020/0367141 A1 | 11/2020 | Cakulev et al. |
| 2020/0382488 A1 | 12/2020 | Liu et al. |
| 2020/0389426 A1 | 12/2020 | Enguehard et al. |
| 2020/0396678 A1 | 12/2020 | Lee et al. |
| 2020/0401452 A1 | 12/2020 | Piercey et al. |
| 2020/0404107 A1 | 12/2020 | Cheng et al. |
| 2021/0011984 A1 | 1/2021 | Renke et al. |
| 2021/0021431 A1 | 1/2021 | Guim Bernat et al. |
| 2021/0026819 A1 | 1/2021 | Beard et al. |
| 2021/0029029 A1 | 1/2021 | Mehmedagic et al. |
| 2021/0029119 A1 | 1/2021 | Raman et al. |
| 2021/0029132 A1 | 1/2021 | Wilczynski et al. |
| 2021/0029168 A1 | 1/2021 | Jeong |
| 2021/0037380 A1 | 2/2021 | Lee et al. |
| 2021/0056524 A1 | 2/2021 | Isgar |
| 2021/0056536 A1 | 2/2021 | Carter et al. |
| 2021/0075631 A1 | 3/2021 | Liao |
| 2021/0076444 A1 | 3/2021 | Shu et al. |
| 2021/0091941 A1 | 3/2021 | Pancras et al. |
| 2021/0099490 A1 | 4/2021 | Crabtree et al. |
| 2021/0105275 A1 | 4/2021 | Bansal et al. |
| 2021/0105596 A1 | 4/2021 | Prabhakar et al. |
| 2021/0109900 A1 | 4/2021 | Mcilroy et al. |
| 2021/0117241 A1 | 4/2021 | Xia |
| 2021/0120408 A1 | 4/2021 | Pazhyannur et al. |
| 2021/0120473 A1 | 4/2021 | Yao et al. |
| 2021/0120596 A1 | 4/2021 | Youn et al. |
| 2021/0122261 A1 | 4/2021 | Qiao et al. |
| 2021/0133313 A1 | 5/2021 | Sakib et al. |
| 2021/0136041 A1 | 5/2021 | Foxhoven et al. |
| 2021/0141655 A1 | 5/2021 | Gamage et al. |
| 2021/0157655 A1 | 5/2021 | Foreman |
| 2021/0168125 A1 | 6/2021 | Vemulpali et al. |
| 2021/0168142 A1 | 6/2021 | Foxhoven et al. |
| 2021/0168613 A1 | 6/2021 | Suh et al. |
| 2021/0168661 A1 | 6/2021 | Wong et al. |
| 2021/0168751 A1 | 6/2021 | Stojanovski et al. |
| 2021/0194760 A1 | 6/2021 | Barton et al. |
| 2021/0211408 A1 | 7/2021 | Porras et al. |
| 2021/0211423 A1 | 7/2021 | Tan et al. |
| 2021/0211870 A1 | 7/2021 | Perras et al. |
| 2021/0218594 A1 | 7/2021 | Sundararajan et al. |
| 2021/0218652 A1 | 7/2021 | Raut et al. |
| 2021/0218801 A1 | 7/2021 | Zhang et al. |
| 2021/0223128 A1 | 7/2021 | Kirch |
| 2021/0224091 A1 | 7/2021 | Hayatnagarkar et al. |
| 2021/0226850 A1 | 7/2021 | Xu et al. |
| 2021/0226910 A1 | 7/2021 | Ranpise et al. |
| 2021/0226987 A1 | 7/2021 | Summers et al. |
| 2021/0227438 A1 | 7/2021 | Xu |
| 2021/0234860 A1 | 7/2021 | Bansal et al. |
| 2021/0234898 A1 | 7/2021 | Desai et al. |
| 2021/0243678 A1 | 8/2021 | Drevon et al. |
| 2021/0250333 A1 | 8/2021 | Negrea et al. |
| 2021/0250890 A1 | 8/2021 | Won |
| 2021/0258859 A1 | 8/2021 | Watfa |
| 2021/0274340 A1 | 9/2021 | Sun et al. |
| 2021/0281572 A1 | 9/2021 | Fernandez-Spadaro et al. |
| 2021/0286899 A1 | 9/2021 | Schroeder et al. |
| 2021/0294970 A1 | 9/2021 | Bender et al. |
| 2021/0306310 A1 | 9/2021 | Tan |
| 2021/0307101 A1 | 9/2021 | Kim et al. |
| 2021/0312400 A1 | 10/2021 | Irimie et al. |
| 2021/0314301 A1 | 10/2021 | Chanak et al. |
| 2021/0314338 A1 | 10/2021 | Howe |
| 2021/0314399 A1 | 10/2021 | Hyun et al. |
| 2021/0320897 A1 | 10/2021 | Stojanovski et al. |
| 2021/0336932 A1 | 10/2021 | Chanak et al. |
| 2021/0336933 A1 | 10/2021 | Shah et al. |
| 2021/0336934 A1 | 10/2021 | Deshmukh et al. |
| 2021/0336959 A1 | 10/2021 | Shah et al. |

(56)         References Cited

U.S. PATENT DOCUMENTS

| | | |
|---|---|---|
| 2021/0344492 A1 | 11/2021 | Goodsitt et al. |
| 2021/0344722 A1 | 11/2021 | Goyal et al. |
| 2021/0360294 A1 | 11/2021 | Liao et al. |
| 2021/0360371 A1 | 11/2021 | Qiao et al. |
| 2021/0367920 A1 | 11/2021 | Devarajan et al. |
| 2021/0367944 A1 | 11/2021 | Gupta et al. |
| 2021/0368339 A1 | 11/2021 | Watfa et al. |
| 2021/0368581 A1 | 11/2021 | Shan |
| 2021/0377210 A1 | 12/2021 | Singh et al. |
| 2021/0377222 A1 | 12/2021 | Sharma et al. |
| 2021/0377223 A1 | 12/2021 | Chanak et al. |
| 2021/0377303 A1 | 12/2021 | Bui et al. |
| 2021/0382739 A1 | 12/2021 | Guo et al. |
| 2021/0385642 A1 | 12/2021 | Di et al. |
| 2021/0385742 A1 | 12/2021 | Liao |
| 2021/0397313 A1 | 12/2021 | Desai et al. |
| 2021/0397463 A1 | 12/2021 | Schimon et al. |
| 2021/0399954 A1 | 12/2021 | Dabell et al. |
| 2021/0400060 A1 | 12/2021 | Chacko |
| 2021/0406127 A1 | 12/2021 | Knierim et al. |
| 2021/0406902 A1 | 12/2021 | Bernert et al. |
| 2021/0409441 A1 | 12/2021 | Singh et al. |
| 2021/0409449 A1 | 12/2021 | Crabtree et al. |
| 2021/0410059 A1 | 12/2021 | Talebi et al. |
| 2022/0007161 A1 | 1/2022 | Shan |
| 2022/0007180 A1 | 1/2022 | Liao et al. |
| 2022/0007437 A1 | 1/2022 | Goenka et al. |
| 2022/0014466 A1 | 1/2022 | Doshi et al. |
| 2022/0014512 A1 | 1/2022 | Raleigh et al. |
| 2022/0029965 A1 | 1/2022 | Chanak et al. |
| 2022/0030495 A1 | 1/2022 | Qiao et al. |
| 2022/0038544 A1 | 2/2022 | Grinstein et al. |
| 2022/0038986 A1 | 2/2022 | Soliman et al. |
| 2022/0039004 A1 | 2/2022 | Soliman et al. |
| 2022/0043665 A1 | 2/2022 | Vidyadhara et al. |
| 2022/0046059 A1 | 2/2022 | Pandurangi et al. |
| 2022/0052850 A1 | 2/2022 | Fagan et al. |
| 2022/0052961 A1 | 2/2022 | Chauhan et al. |
| 2022/0053449 A1 | 2/2022 | Shan |
| 2022/0060398 A1 | 2/2022 | Shishir et al. |
| 2022/0060507 A1 | 2/2022 | Crabtree et al. |
| 2022/0060509 A1 | 2/2022 | Crabtree et al. |
| 2022/0060557 A1 | 2/2022 | Bathla et al. |
| 2022/0070183 A1 | 3/2022 | Goyal |
| 2022/0070967 A1 | 3/2022 | Li et al. |
| 2022/0086639 A1 | 3/2022 | Lu et al. |
| 2022/0092024 A1 | 3/2022 | Kavaipatti et al. |
| 2022/0094706 A1 | 3/2022 | Higgins et al. |
| 2022/0095260 A1 | 3/2022 | Shan |
| 2022/0103525 A1 | 3/2022 | Shribman et al. |
| 2022/0103987 A1 | 3/2022 | Shan |
| 2022/0104164 A1 | 3/2022 | Kedalagudde et al. |
| 2022/0104296 A1 | 3/2022 | Mary et al. |
| 2022/0109696 A1 | 4/2022 | Deshmukh et al. |
| 2022/0110023 A1 | 4/2022 | Wu et al. |
| 2022/0116397 A1 | 4/2022 | Deshmukh et al. |
| 2022/0116814 A1 | 4/2022 | Di et al. |
| 2022/0117036 A1 | 4/2022 | Moustafa et al. |
| 2022/0124521 A1 | 4/2022 | Xu et al. |
| 2022/0124595 A1 | 4/2022 | Xu et al. |
| 2022/0129583 A1 | 4/2022 | Balasubramanian et al. |
| 2022/0141662 A1 | 5/2022 | Liao |
| 2022/0150280 A1 | 5/2022 | Azulay et al. |
| 2022/0150312 A1 | 5/2022 | Ranpise et al. |
| 2022/0159003 A1 | 5/2022 | Butcher et al. |
| 2022/0159029 A1 | 5/2022 | Bendersky et al. |
| 2022/0159527 A1 | 5/2022 | Lee et al. |
| 2022/0159605 A1 | 5/2022 | Li et al. |
| 2022/0164186 A1 | 5/2022 | Pamidala et al. |
| 2022/0167299 A1 | 5/2022 | Xu et al. |
| 2022/0174580 A1 | 6/2022 | You et al. |
| 2022/0182412 A1 | 6/2022 | Borak |
| 2022/0191052 A1 | 6/2022 | Garcia et al. |
| 2022/0191100 A1 | 6/2022 | Kim et al. |
| 2022/0191736 A1 | 6/2022 | Barton et al. |
| 2022/0191765 A1 | 6/2022 | Ding |
| 2022/0200924 A1 | 6/2022 | Lu et al. |
| 2022/0200972 A1 | 6/2022 | Potlapally et al. |
| 2022/0200993 A1 | 6/2022 | Smith |
| 2022/0201041 A1 | 6/2022 | Keiser et al. |
| 2022/0201638 A1 | 6/2022 | Arrobo et al. |
| 2022/0210698 A1 | 6/2022 | Ly et al. |
| 2022/0217084 A1 | 7/2022 | Arora et al. |
| 2022/0224703 A1 | 7/2022 | Devarajan |
| 2022/0225448 A1 | 7/2022 | Li et al. |
| 2022/0232020 A1 | 7/2022 | Kandachar et al. |
| 2022/0232363 A1 | 7/2022 | Watfa et al. |
| 2022/0239698 A1 | 7/2022 | Anantharaju |
| 2022/0247771 A1 | 8/2022 | Higgins et al. |
| 2022/0255966 A1 | 8/2022 | Sienicki et al. |
| 2022/0263835 A1 | 8/2022 | Pieczul et al. |
| 2022/0263913 A1 | 8/2022 | Zhang et al. |
| 2022/0264370 A1 | 8/2022 | Qiao et al. |
| 2022/0264403 A1 | 8/2022 | Watfa et al. |
| 2022/0264444 A1 | 8/2022 | Ryu et al. |
| 2022/0264503 A1 | 8/2022 | Starsinic et al. |
| 2022/0266451 A1 | 8/2022 | Cristache |
| 2022/0272614 A1 | 8/2022 | Lu et al. |
| 2022/0272620 A1 | 8/2022 | Ninglekhu et al. |
| 2022/0278900 A1 | 9/2022 | Pieczul et al. |
| 2022/0279075 A1 | 9/2022 | Fan et al. |
| 2022/0286428 A1 | 9/2022 | Howe et al. |
| 2022/0286429 A1 | 9/2022 | Howe et al. |
| 2022/0286480 A1 | 9/2022 | Jadhav et al. |
| 2022/0286911 A1 | 9/2022 | Howe et al. |
| 2022/0294540 A1 | 9/2022 | Black et al. |
| 2022/0295440 A1 | 9/2022 | Kumar et al. |
| 2022/0309152 A1 | 9/2022 | Araujo et al. |
| 2022/0311767 A1 | 9/2022 | Ouellet |
| 2022/0312176 A1 | 9/2022 | Matolia et al. |
| 2022/0312299 A1 | 9/2022 | Mochizuki et al. |
| 2022/0312517 A1 | 9/2022 | Xu et al. |
| 2022/0329442 A1 | 10/2022 | Bulusu et al. |
| 2022/0329477 A1 | 10/2022 | Chiganmi et al. |
| 2022/0329495 A1 | 10/2022 | Xie et al. |
| 2022/0329585 A1 | 10/2022 | Chhabra et al. |
| 2022/0330138 A1 | 10/2022 | Shan |
| 2022/0330193 A1 | 10/2022 | Shan |
| 2022/0334864 A1 | 10/2022 | KN et al. |
| 2022/0338000 A1 | 10/2022 | Lee et al. |
| 2022/0345875 A1 | 10/2022 | Kumar |
| 2022/0353244 A1 | 11/2022 | Kahn et al. |
| 2022/0353799 A1 | 11/2022 | Talebi et al. |
| 2022/0360670 A1 | 11/2022 | Singh et al. |
| 2022/0361136 A1 | 11/2022 | Watfa et al. |
| 2022/0368726 A1 | 11/2022 | Balasubramanian et al. |
| 2022/0369408 A1 | 11/2022 | Shariat et al. |
| 2022/0377529 A1 | 11/2022 | Kim et al. |
| 2022/0377617 A1 | 11/2022 | Deng et al. |
| 2022/0377654 A1 | 11/2022 | Soliman et al. |
| 2022/0386100 A1 | 12/2022 | Lee et al. |
| 2022/0391867 A1 | 12/2022 | Glaser |
| 2022/0393943 A1 | 12/2022 | Pangeni et al. |
| 2022/0394566 A1 | 12/2022 | Liu et al. |
| 2022/0400378 A1 | 12/2022 | Wang et al. |
| 2022/0408396 A1 | 12/2022 | Youn et al. |
| 2022/0413883 A1 | 12/2022 | Clebsch et al. |
| 2022/0417252 A1 | 12/2022 | Moon et al. |
| 2022/0417264 A1 | 12/2022 | Moon |
| 2022/0417286 A1 | 12/2022 | Moon et al. |
| 2023/0007439 A1 | 1/2023 | Williams et al. |
| 2023/0007464 A1 | 1/2023 | Lee et al. |
| 2023/0007611 A1 | 1/2023 | Karampatsis et al. |
| 2023/0011468 A1 | 1/2023 | Giri et al. |
| 2023/0015603 A1 | 1/2023 | Smith |
| 2023/0018809 A1 | 1/2023 | Deshmukh |
| 2023/0019448 A1 | 1/2023 | Deshmukh et al. |
| 2023/0022134 A1 | 1/2023 | Talwar et al. |
| 2023/0023571 A1 | 1/2023 | Xing et al. |
| 2023/0024999 A1 | 1/2023 | Wu et al. |
| 2023/0027290 A1 | 1/2023 | Chen et al. |
| 2023/0027507 A1 | 1/2023 | He et al. |
| 2023/0029714 A1 | 2/2023 | Xu et al. |
| 2023/0032313 A1 | 2/2023 | Curtis et al. |

(56) References Cited

U.S. PATENT DOCUMENTS

| | | |
|---|---|---|
| 2023/0032790 A1 | 2/2023 | Mahajan et al. |
| 2023/0040365 A1 | 2/2023 | Raleigh |
| 2023/0040747 A1 | 2/2023 | Watfa et al. |
| 2023/0042646 A1 | 2/2023 | Mahadevan et al. |
| 2023/0044346 A1 | 2/2023 | Nuggehalli et al. |
| 2023/0052699 A1 | 2/2023 | Ninglekhu et al. |
| 2023/0052827 A1 | 2/2023 | Araujo et al. |
| 2023/0056442 A1 | 2/2023 | Ly et al. |
| 2023/0058336 A1 | 2/2023 | Kim et al. |
| 2023/0059173 A1 | 2/2023 | Moon |
| 2023/0059726 A1 | 2/2023 | Osipov et al. |
| 2023/0067223 A1 | 3/2023 | Freed et al. |
| 2023/0073757 A1 | 3/2023 | Chandramouli et al. |
| 2023/0078317 A1 | 3/2023 | Xing et al. |
| 2023/0083175 A1 | 3/2023 | Xiong |
| 2023/0094062 A1 | 3/2023 | Kim et al. |
| 2023/0098558 A1 | 3/2023 | Savir et al. |
| 2023/0109272 A1 | 4/2023 | Ryu et al. |
| 2023/0113180 A1 | 4/2023 | Srinivasan et al. |
| 2023/0113519 A1 | 4/2023 | Fernandez et al. |
| 2023/0115982 A1 | 4/2023 | Lin et al. |
| 2023/0116463 A1 | 4/2023 | Rath et al. |
| 2023/0118271 A1 | 4/2023 | Punathil |
| 2023/0129117 A1 | 4/2023 | Ding et al. |
| 2023/0130746 A1 | 4/2023 | Binder et al. |
| 2023/0133444 A1 | 5/2023 | Dimitrovski et al. |
| 2023/0135699 A1 | 5/2023 | Liao et al. |
| 2023/0136984 A1 | 5/2023 | Lee et al. |
| 2023/0138033 A1 | 5/2023 | Rajadurai et al. |
| 2023/0147538 A1 | 5/2023 | Lee et al. |
| 2023/0153447 A1 | 5/2023 | Kapadia |
| 2023/0156513 A1 | 5/2023 | Xing et al. |
| 2023/0156514 A1 | 5/2023 | Eriksson et al. |
| 2023/0163984 A1 | 5/2023 | Shan |
| 2023/0164523 A1 | 5/2023 | Wu et al. |
| 2023/0171280 A1 | 6/2023 | Bansal |
| 2023/0171824 A1 | 6/2023 | Purkayastha et al. |
| 2023/0179632 A1 | 6/2023 | Duraisamy et al. |
| 2023/0188525 A1 | 6/2023 | Singh et al. |
| 2023/0189192 A1 | 6/2023 | Talebi et al. |
| 2023/0195884 A1 | 6/2023 | Belair et al. |
| 2023/0198946 A1 | 6/2023 | Zacks et al. |
| 2023/0199006 A1 | 6/2023 | Gurnov et al. |
| 2023/0199017 A1 | 6/2023 | Peter |
| 2023/0199632 A1 | 6/2023 | Talebi et al. |
| 2023/0205505 A1 | 6/2023 | Chen et al. |
| 2023/0206329 A1 | 6/2023 | Cella et al. |
| 2023/0206348 A1 | 6/2023 | Reddy et al. |
| 2023/0208810 A1 | 6/2023 | Dhanasekar et al. |
| 2023/0209329 A1 | 6/2023 | Guo et al. |
| 2023/0224304 A1 | 7/2023 | Lukanov et al. |
| 2023/0231884 A1 | 7/2023 | Deshmukh et al. |
| 2023/0239270 A1 | 7/2023 | Nahas et al. |
| 2023/0239325 A1 | 7/2023 | Keiser, Jr. |
| 2023/0247003 A1 | 8/2023 | Chanak et al. |
| 2023/0247027 A1 | 8/2023 | Brar et al. |
| 2023/0247087 A1 | 8/2023 | Nagaraja et al. |
| 2023/0254318 A1 | 8/2023 | Hu et al. |
| 2023/0262030 A1 | 8/2023 | Bansal et al. |
| 2023/0262818 A1 | 8/2023 | Kim et al. |
| 2023/0269137 A1 | 8/2023 | Fehring et al. |
| 2023/0283639 A1 | 9/2023 | Melson et al. |
| 2023/0284077 A1 | 9/2023 | Pateromichelakis |
| 2023/0290485 A1 | 9/2023 | Fairuz et al. |
| 2023/0291735 A1 | 9/2023 | Cheethirala et al. |
| 2023/0300651 A1 | 9/2023 | Kim et al. |
| 2023/0300702 A1 | 9/2023 | You et al. |
| 2023/0309158 A1 | 9/2023 | Qiao et al. |
| 2023/0319047 A1 | 10/2023 | Wu et al. |
| 2023/0319112 A1 | 10/2023 | Kaimal et al. |
| 2023/0319679 A1 | 10/2023 | Sung et al. |
| 2023/0319685 A1 | 10/2023 | Talebi et al. |
| 2023/0319915 A1 | 10/2023 | Paladugu et al. |
| 2023/0328821 A1 | 10/2023 | Talebi et al. |
| 2023/0336471 A1 | 10/2023 | Dhody |
| 2023/0336977 A1 | 10/2023 | Henry et al. |
| 2023/0344917 A1 | 10/2023 | Chanak et al. |
| 2023/0362198 A1 | 11/2023 | Jung et al. |
| 2023/0362623 A1 | 11/2023 | Lee et al. |
| 2023/0362632 A1 | 11/2023 | Hu et al. |
| 2023/0362640 A1 | 11/2023 | Edge |
| 2023/0362704 A1 | 11/2023 | Edge et al. |
| 2023/0367833 A1 | 11/2023 | Kol et al. |
| 2023/0368193 A1 | 11/2023 | Russinovich et al. |
| 2023/0370992 A1 | 11/2023 | You et al. |
| 2023/0371111 A1 | 11/2023 | Xu et al. |
| 2023/0388785 A1 | 11/2023 | Ferdi et al. |
| 2023/0397086 A1 | 12/2023 | Kim et al. |
| 2023/0403272 A1 | 12/2023 | Cheethirala et al. |
| 2023/0403305 A1 | 12/2023 | Dementyev et al. |
| 2023/0412638 A1 | 12/2023 | Dogaru et al. |
| 2023/0421478 A1 | 12/2023 | Chhabra |
| 2023/0422149 A1 | 12/2023 | Kim et al. |
| 2024/0007983 A1 | 1/2024 | Liu et al. |
| 2024/0008130 A1 | 1/2024 | Kim et al. |
| 2024/0012674 A1 | 1/2024 | Xie et al. |
| 2024/0015567 A1 | 1/2024 | Mladin et al. |
| 2024/0022469 A1 | 1/2024 | Hu et al. |
| 2024/0022593 A1 | 1/2024 | Costa et al. |
| 2024/0048229 A1 | 2/2024 | Kumar et al. |
| 2024/0048966 A1 | 2/2024 | Suh |
| 2024/0049171 A1 | 2/2024 | Khirallah et al. |
| 2024/0056904 A1 | 2/2024 | Watfa et al. |
| 2024/0056947 A1 | 2/2024 | Watfa et al. |
| 2024/0056957 A1 | 2/2024 | Wang |
| 2024/0073249 A1 | 2/2024 | Cirello Filho et al. |
| 2024/0073252 A1 | 2/2024 | Kathpal et al. |
| 2024/0073772 A1 | 2/2024 | Gupta et al. |
| 2024/0080340 A1 | 3/2024 | Ben et al. |
| 2024/0080342 A1 | 3/2024 | Mishra et al. |
| 2024/0080730 A1 | 3/2024 | Zhang et al. |
| 2024/0080791 A1 | 3/2024 | Aghili et al. |
| 2024/0086558 A1 | 3/2024 | Jadhav et al. |
| 2024/0089291 A1 | 3/2024 | Shpilyuck et al. |
| 2024/0098089 A1 | 3/2024 | Adogla et al. |
| 2024/0104553 A1 | 3/2024 | Thorpe |
| 2024/0106821 A1 | 3/2024 | Crawford et al. |
| 2024/0106833 A1 | 3/2024 | Ravichandran et al. |
| 2024/0106855 A1 | 3/2024 | Sundararajan et al. |
| 2024/0107481 A1 | 3/2024 | Tiwari et al. |
| 2024/0111821 A1 | 4/2024 | Dogaru et al. |
| 2024/0114057 A1 | 4/2024 | Bjerrum et al. |
| 2024/0129321 A1 | 4/2024 | Howe et al. |
| 2024/0129338 A1 | 4/2024 | Azad et al. |
| 2024/0146689 A1 | 5/2024 | Bansal et al. |
| 2024/0147207 A1 | 5/2024 | Watfa et al. |
| 2024/0152602 A1 | 5/2024 | Belair et al. |
| 2024/0154970 A1 | 5/2024 | Cheethirala et al. |
| 2024/0163308 A1 | 5/2024 | Kahn et al. |
| 2024/0163312 A1 | 5/2024 | Azad et al. |
| 2024/0168793 A1 | 5/2024 | Pyka et al. |
| 2024/0169062 A1 | 5/2024 | Lee et al. |
| 2024/0171969 A1 | 5/2024 | Kumar et al. |
| 2024/0179066 A1 | 5/2024 | Shen et al. |
| 2024/0179070 A1 | 5/2024 | Zhou et al. |
| 2024/0179071 A1 | 5/2024 | Zhou et al. |
| 2024/0179168 A1 | 5/2024 | Manthiramoorthy et al. |
| 2024/0179182 A1 | 5/2024 | Hicks et al. |
| 2024/0179188 A1 | 5/2024 | Torlak et al. |
| 2024/0179509 A1 | 5/2024 | Fu et al. |
| 2024/0187968 A1 | 6/2024 | Tiwari et al. |
| 2024/0187990 A1 | 6/2024 | Chen et al. |
| 2024/0205191 A1 | 6/2024 | Vijayvargiya et al. |
| 2024/0205863 A1 | 6/2024 | Nassar et al. |
| 2024/0236047 A1 | 7/2024 | Filho et al. |
| 2024/0241978 A1 | 7/2024 | Chopra et al. |
| 2024/0244014 A1 | 7/2024 | De et al. |
| 2024/0273211 A1 | 8/2024 | Singh |
| 2024/0275680 A1 | 8/2024 | Palnati et al. |
| 2024/0275803 A1 | 8/2024 | Varanasi et al. |
| 2024/0283826 A1 | 8/2024 | Ganguli et al. |
| 2024/0291846 A1 | 8/2024 | Saraf et al. |
| 2024/0297881 A1 | 9/2024 | Bansal |
| 2024/0303336 A1 | 9/2024 | Tammireddy et al. |

(56)　　　　　　References Cited

U.S. PATENT DOCUMENTS

| | | |
|---|---|---|
| 2024/0314140 A1 | 9/2024 | Beevor |
| 2024/0314176 A1 | 9/2024 | Varanasi et al. |
| 2024/0323189 A1 | 9/2024 | Mihajlovic et al. |
| 2024/0334190 A1 | 10/2024 | Cheethirala et al. |
| 2024/0356918 A1 | 10/2024 | Darbarwar et al. |
| 2024/0364704 A1 | 10/2024 | Darbarwar et al. |
| 2024/0388606 A1 | 11/2024 | Mihajlovic et al. |
| 2024/0422198 A1 | 12/2024 | Pampati et al. |
| 2025/0112923 A1 | 4/2025 | Cirello Filho et al. |
| 2025/0112930 A1 | 4/2025 | Kozin et al. |
| 2025/0112962 A1 | 4/2025 | Cirello Filho et al. |
| 2025/0117486 A1 | 4/2025 | Pickman et al. |
| 2025/0150573 A1 | 5/2025 | Pantapalli et al. |

OTHER PUBLICATIONS

Office Communication for U.S. Appl. No. 18/091,006 mailed Apr. 19, 2023, 9 Pages.
Office Communication for U.S. Appl. No. 17/954,697 mailed May 12, 2023, 5 Pages.
Office Communication for U.S. Appl. No. 18/131,151 mailed Jun. 8, 2023, 9 Pages.
Office Communication for U.S. Appl. No. 17/954,697 mailed Jan. 20, 2023, 13 Pages.
Office Communication for U.S. Appl. No. 18/094,858 mailed Mar. 16, 2023, 10 Pages.
Office Communication for U.S. Appl. No. 18/091,006 mailed Mar. 31, 2023, 12 Pages.
Office Communication for U.S. Appl. No. 17/733,735 mailed Jul. 12, 2022, 38 Pages.
Office Communication for U.S. Appl. No. 17/733,735 mailed Nov. 1, 2022, 7 Pages.
Office Communication for U.S. Appl. No. 17/889,788 mailed Nov. 7, 2022, 12 Pages.
Office Communication for U.S. Appl. No. 18/091,895 mailed Apr. 5, 2023, 12 Pages.
Office Communication for U.S. Appl. No. 18/094,858 mailed Jul. 7, 2023, 12 Pages.
Office Communication for U.S. Appl. No. 18/131,151 mailed Jul. 10, 2023, 7 Pages.
Office Communication for U.S. Appl. No. 18/094,858 mailed Sep. 19, 2023, 4 Pages.
Office Communication for U.S. Appl. No. 18/091,895 mailed Jul. 11, 2023, 9 pages.
Office Communication for U.S. Appl. No. 18/236,360 mailed Oct. 25, 2023, 12 pages.
Office Communication for U.S. Appl. No. 18/236,360 mailed Nov. 13, 2023, 2 pages.
Office Communication for U.S. Appl. No. 18/238,649 mailed Nov. 1, 2023, 13 pages.
Office Communication for U.S. Appl. No. 18/094,858 mailed Oct. 25, 2023, 7 pages.
Office Communication for U.S. Appl. No. 18/238,649 mailed Jan. 26, 2024, 11 pages.

Office Communication for U.S. Appl. No. 18/238,649 mailed Feb. 26, 2024, 4 pages.
Office Communication for U.S. Appl. No. 18/238,649 mailed Mar. 14, 2024, 5 pages.
Office Communication for U.S. Appl. No. 18/587,821 mailed May 3, 2024, 12 pages.
Office Communication for U.S. Appl. No. 18/740,622 mailed Sep. 5, 2024, 54 pages.
Jennings et al REsource Location and Discoveryu (RELOAD) Base Protocol, Internet Engineering Task Force (IETF), Request for Comments:RFC 6940, pp. 1-176 (Year: 2014).
Uriarte et al "Expressive Policy-Based Access Control for Resource-Constrained Devices," Special Section on Security and Privacy in Applications and Services for Future Internet of Things, IEEE Access, pp. 15-46 (Year: 2017).
Office Communication for U.S. Appl. No. 18/740,667 mailed Sep. 19, 2024, 8 pages.
Office Communication for U.S. Appl. No. 18/740,622 mailed Jan. 10, 2025, 39 pages.
Soltani et al "A New Approach to Client Onboarding using Self-Sovereign Identity and Distributed Ledger," IEEE, 2018, pp. 1129-1136.
Seleznyov et al "An Access Control Model Based on Distributed Knowledge Management," IEEE Computer Society, 2004, pp. 1-4.
Office Communication for U.S. Appl. No. 18/740,667 mailed Jan. 23, 2025, 11 pages.
Office Communication for U.S. Appl. No. 18/899,488 mailed Jan. 16, 2025, 9 pages.
Office Communication for U.S. Appl. No. 19/048,457 mailed Apr. 2, 2025, 14 pages.
Office Communication for U.S. Appl. No. 18/740,622 mailed Apr. 7, 2025, 3 pages.
Office Communication for U.S. Appl. No. 18/740,622 mailed May 5, 2025, 34 pages.
Northern et al., "Building Secure Environments for Microservices" SRMC, Year: 2022, pp. 27-31.
Al Qassem et al., "Optimal Resource Allocation for Containerized Cloud Microservices", ICECTA, Year: 2022, pp. 271-274.
Office Communication for U.S. Appl. No. 19/063,742 mailed Apr. 24, 2025, 9 pages.
Office Communication for U.S. Appl. No. 19/063,742 mailed Aug. 12, 2025, 7 pages.
Office Communication for U.S. Appl. No. 19/094,182 mailed May 22, 2025, 24 pages.
Office Communication for U.S. Appl. No. 19/094,182 mailed Aug. 21, 2025, 10 pages.
Office Communication for U.S. Appl. No. 19/094,182 mailed Sep. 2, 2025, 6 pages.
Zhang et al., "Time Series Anomaly Detection via Reinforcement Learning-Based Model Selection," 2022 IEEE (CCECE), pp. 193-199.
An et al., "GPT-LAD: Leveraging Large Multimodal Models for Logical Anomaly Detection," ICASSP 2025, Apr. 2025, pp. 1-5.
Office Communication for U.S. Appl. No. 19/394,145 mailed Jan. 27, 2026, 14 pages.

* cited by examiner

Terminal _700_ user1:~$
user1:~$edge dbclient "SELECT * FROM MyTable"      _702_
user1:~$edge ERROR 1234 : Can't connect to local DB server      _704_

Shortcut      _706_

Display Name: DB Reports      _708_      _710_

Target: edge dbreports

FINE-GRAINED SECURITY POLICY ENFORCEMENT FOR APPLICATIONS

CROSS-REFERENCE TO RELATED APPLICATIONS

This Utility patent application is a Continuation of U.S. patent application Ser. No. 19/063,742 filed on Feb. 26, 2025, now U.S. Pat. No. 12,423,418 issued on Sep. 23, 2025, which is a Continuation of U.S. patent application Ser. No. 18/899,488 filed on Sep. 27, 2024, now U.S. Pat. No. 12,242,599 issued on Mar. 4, 2025, the benefit of the filing date of which are hereby claimed under 35 U.S.C. § 120, and the contents of which are further incorporated in entirety by reference.

TECHNICAL FIELD

The present invention relates generally to network security, and more particularly, but not exclusively, to fine-grained security policy enforcement for applications.

BACKGROUND

As organizations become increasingly dependent on networked environments, remote services, distributed services, or the like, managing and monitoring infrastructure access in networked environments can become both critically important and more difficult. Difficulties in managing network environments may not be new, however, interconnections among remote offices, data centers, remote employees, remote customers, and so on, have resulted in organizations relying more broadly on heterogeneous distributed networked services, or the like. Also, in some cases, the regulatory environment has been adapting to the increase in computer-based services. Accordingly, organizations may be required to comply with regulatory regimes from multiple jurisdictions related to various critical subjects, such as finance, privacy, employee rights, cross-jurisdiction taxation, and so on. The combination of the increase in reliance on distributed and networked services and ongoing changes in regulatory environments has tended to elevate the importance of managing and monitoring infrastructure access in networked environments both for operations as well as compliance with various regulatory regimes. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
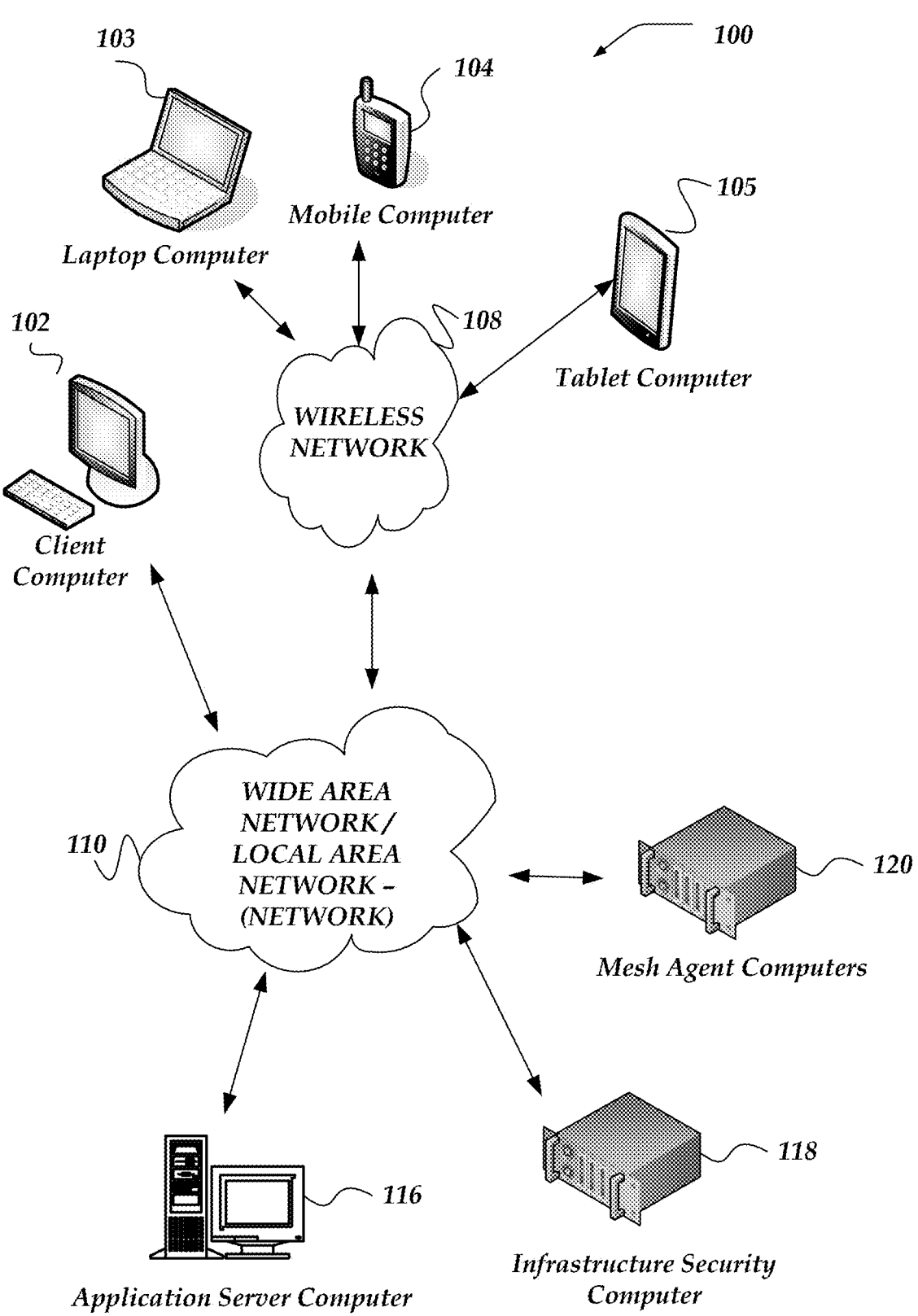
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, Python, R, Julia, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications or can be divided into sub-engines. The engines can be stored in non-transitory computer-readable medium or computer storage devices and be stored on and executed by one or more general purpose computers, thus creating a special purpose computer configured to provide the engine.

As used herein, the term "session" refers to a semi-permanent interactive packet interchange between two or more communicating endpoints in a networked environment. A session is set up or established at a certain point in time and torn down at a later point in time. An established communication session may involve more than one message in each direction. A session may have stateful communication where at least one of the communicating endpoints saves information about the session history to be able to communicate. A session may also provide stateless communication, where the communication consists of independent requests with responses between the endpoints. An established session is the basic requirement to perform a connection-oriented communication. A session also is the basic step to transmit in connectionless communication modes.

As used herein, the terms "network connection," and "connection" refer to an interactive packet interchange between two or more communicating endpoints, such as network devices. Connections may be established before application data is transferred, and where a stream of data is delivered in the same or different order than it was sent. The alternative to connection-oriented transmission is connectionless communication. For example, the datagram mode of communication used by the Internet Protocol (IP) and the Universal Datagram Protocol (UDP) may deliver packets out of order, since different packets may be routed independently and could be delivered over different paths. Packets associated with a TCP protocol connection may also be routed independently and could be delivered over different paths. However, for TCP connections the network communication system may provide the packets to application endpoints in the correct order.

As used herein, the term "tuple" refers to a set of values that identify a source and destination of a network communication or network traffic packet, which may, under some circumstances, be a part of a network connection. In one embodiment, a tuple may include a source Internet Protocol (IP) address, a destination IP address, a source port number, a destination port number, virtual LAN segment identifier (VLAN ID), tunnel identifier, routing interface identifier, physical interface identifier, or a protocol identifier. Tuples may be used to identify network flows (e.g., connection flows).

As used herein, the term, "protocol" refers generally to network protocols that may be employed in a network, including data-link layer protocols, transport layer protocols, application layer protocols, or the like. Thus, unless otherwise indicated, innovations described as working with or being associated with a protocol may be applicable to protocols of various OSI layers, or the like, or combination thereof.

As used herein, the term, "application protocol" refers generally to communication protocols that may be employed in a network that enable one or more applications or services and their client applications to communicate in a networked environment. Application protocols may be considered distinct from transport protocols that may be used to ferry application protocol traffic in networks or among processes/services.

As used herein, the term "mesh agent" refers to programs, process, or services that provide a node, link, or hop in a software defined network. Multiple mesh agents may provide secure tunnels between each other to provide a secure overlay network that may be provided in a conventional underlay network. In some cases, one or more mesh agents may be hosted on network computers in a networked environment.

As used herein, the term "ingress agent" refers to a mesh agent that a client application or user gains access to an overlay network. Ingress agents may be considered mesh agents that are on a logical edge of an overlay network. For example, if a client application requires access to an overlay network to access a protected resource, the first mesh agent that the client application communicates to join or access the overlay network may be considered an ingress agent.

As used herein, the term "egress agent" refers to a mesh agent that may directly communicate with a protected resource. Egress agents may be considered mesh agents that are on a logical edge of an overlay network. For example, client requests provided by a client to an ingress agent may be forwarded through one or more mesh agents in an overlay network until they reach an egress agent associated with the target resource.

As used herein, the term "credential information" refers to data or data structures that include credential secrets that enable access to protected resource servers. For example, credential information may include usernames, passwords, pass-phrases, security certificates, or the like.

As used herein, the "activity" refers to one or more application protocols, applications, or the like. For brevity, policy containers may be described as being associated with activities. For example, a policy container may be associated with HTTP traffic while another policy container may be associated with a database application. Accordingly, in some embodiments, policies in a given policy container may be directed to enforcing policies on for a particular activity. Note, one of ordinary skill in the art will appreciate that the definition or declaration of an activity may vary depending on local requirements or local circumstances. Accordingly, in some embodiments, infrastructure security computers may provide user interfaces or configuration information that enable administrators of overlay networks to have broad authority to define or declare activities that may be relevant.

As used herein, the term "policy" refers to data or data structures that include particular instructions or declarations that may be evaluated to determine if a resource may be accessed by a client in an overlay network.

As used herein, the term "request" refers to data that may be directed from a client endpoint in an overlay network to a target resource in the overlay network. Requests may be considered to include data or messages that may initiate or establish transactions, sessions, actions, or the like, with target resources. In the course of a session, the different endpoints of a session may take on the role of clients or servers depending on the direction of communication or behavior of the application. Likewise, in some cases, requests may be considered part of streaming sessions and are not limited to being single requests that synchronously wait for a single response.

As used herein, the term "response" refers to data that may be directed from a target resource to a client endpoint in an overlay network. Responses may be considered to include data or messages that may initiate, establish, or complete transactions, sessions, actions, or the like, based on requests from clients. In the course of a session, the different endpoints of a session may take on the role of clients or servers depending on the direction of communication or behavior of the application. Likewise, in some cases, responses may be considered part of streaming sessions and are not limited to being single responses to a single response.

As used herein, the term, "configuration information" refers to information that may include rule based policies, pattern matching, scripts (e.g., computer readable instructions), or the like, that may be provided from various sources, including, configuration files, databases, user input, built-in defaults, or the like, or combination thereof. In some cases, configuration information may include or reference information stored in other systems or services, such as, configuration management databases, Lightweight Directory Access Protocol (LDAP) servers, name services, public key infrastructure services, or the like.

The following briefly describes embodiments of the invention to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing interactions with applications in a computing environment. In one or more of the various embodiments, one or more state elements may be generated based on one or more application requests from a client such that the one or more state elements each include information associated with the one or more application requests or an application server that may be a target of the one or more application requests.

In one or more of the various embodiments, the one or more state elements may be enqueued in a state queue to reduce memory consumption that may be associated with an application session for the one or more application requests such that the one or more application requests may be forwarded to the application server.

In one or more of the various embodiments, one or more application responses from the application server may be employed to perform further actions, including: generating one or more message elements based on the one or more application responses such that the one or more message elements may be enqueued in a message queue to reduce memory consumption associated in the application session; determining a portion of the one or more state elements in the state queue that may be associated the one or more message elements based on an association between the portion of the one or more state elements and the one or more message elements; updating the portion of the one or more state elements to advance a protocol state based on the one or more message elements that may be associated with the portion of the one or more state elements such that the one or more application responses may be communicated to the client; dequeing the portion of the one or more state elements from the state queue; dequeing the one or more message elements from the message queues; or the like.

In one or more of the various embodiments, a first application request may be employed to perform additional actions, including: initializing the application session based on the client such that the application session may be associated with the client and the application server; generating the state queue and associating it with the application session; generating the message queue and associating it with the application session; or the like. In some embodiments, another application request from another client may be employed to perform other actions, including: initializing another application session that may be associated with the other client and the application server; \ generating another state queue and another message queue such that the other state queue and the other message queue may be associated with the other application session; or the like.

In one or more of the various embodiments, a protocol map may be determined based on a protocol associated with the protocol state. In some embodiments, a sequence of the one or more application requests and another sequence of the one or more application responses may be validated as conforming to the protocol based on the protocol map. In some embodiments, the contents of the one or more application requests and other contents of the one or more application responses may be validated as conforming to the protocol based on the protocol map. In some embodiments, a failure to validate the one or more application requests or another failure to validate the one or more application responses may be employed to terminate the application session.

In one or more of the various embodiments, generating the one or more state elements may include: determining one or more policy instructions associated with the application session based on an overlay network policy; including the one or more policy instructions in the one or more state elements; modifying the one or more application requests based on the one or more policy instructions; or the like.

In one or more of the various embodiments, generating the one or more message elements may include: determining one or more policy instructions associated with the application session based on an overlay network policy; including the one or more policy instructions in the one or more message elements; modifying the one or more application responses based on the one or more policy instructions; or the like.

In one or more of the various embodiments, determining the portion of the one or more state elements in the state queue that may be associated with the one or more message elements based on an association between the portion of the one or more state elements and the one or more message elements may include: determining one or more features of a protocol corresponding to the protocol state that associates an application response with an application request based the protocol such that the one or more features include one or more of a sequence number, a timestamp, the client identity, a network address, or the like; determining the association between the portion of the one or more state elements and the one or more message elements based on the one or more features of the protocol; or the like.

In one or more of the various embodiments, one or more of the state queue or the message queue that exceeds its memory capacity may be determined based on one or more of the application requests or the application responses. In some embodiments, terminating the application session.

Illustrated Operating Environment

FIG. 1 shows components of one embodiment of an environment in which embodiments of the innovations disclosed herein may be practiced. Not all of the components may be required to practice these innovations, and variations in the arrangement and type of the components may be made without departing from the spirit or scope of these innovations. As shown, system 100 of FIG. 1 includes local area networks (LANs)/wide area networks (WANs)-(network) 110, wireless network 108, client computers 102-105, application server computer 116, infrastructure security computer 118, one or more mesh agent computers 120, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, infrastructure security computer 118, mesh agent computers 120, or other computers.

Client computers 102-105 may further be configured to include a client application that enables an end-user to log into an end-user account that may be managed by another computer, such as application server computer 116, infrastructure security computer 118, mesh agent computers 120, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide configuration information, policy information, or the like, to infrastructure security computer 118. Also, client computers may be arranged to enable users to display reports, interactive user-interfaces, results provided by infrastructure security computer 118, mesh agent computers 120, or the like. Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobile communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, infrastructure security computer 118, mesh agent computers 120, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information using one or more network protocols, such Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of application server computer 116, infrastructure security computer 118, and mesh agent computers 120 are described in more detail below in conjunction with FIG. 3. Although FIG. 1 illustrates application server computer 116, infrastructure security computer 118, and mesh agent computers 120 each as a single computer, the innovations or embodiments are not so limited. For example, one or more functions of application server computer 116, infrastructure security computer 118, and mesh agent computers 120, or the like, may be distributed across one or more distinct network computers. Moreover, in one or more embodiments, infrastructure security computer 118 may be implemented using a plurality of network computers. Further, in one or more of the various embodiments, application server computer 116, infrastructure security computer 118, or mesh agents 120 may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
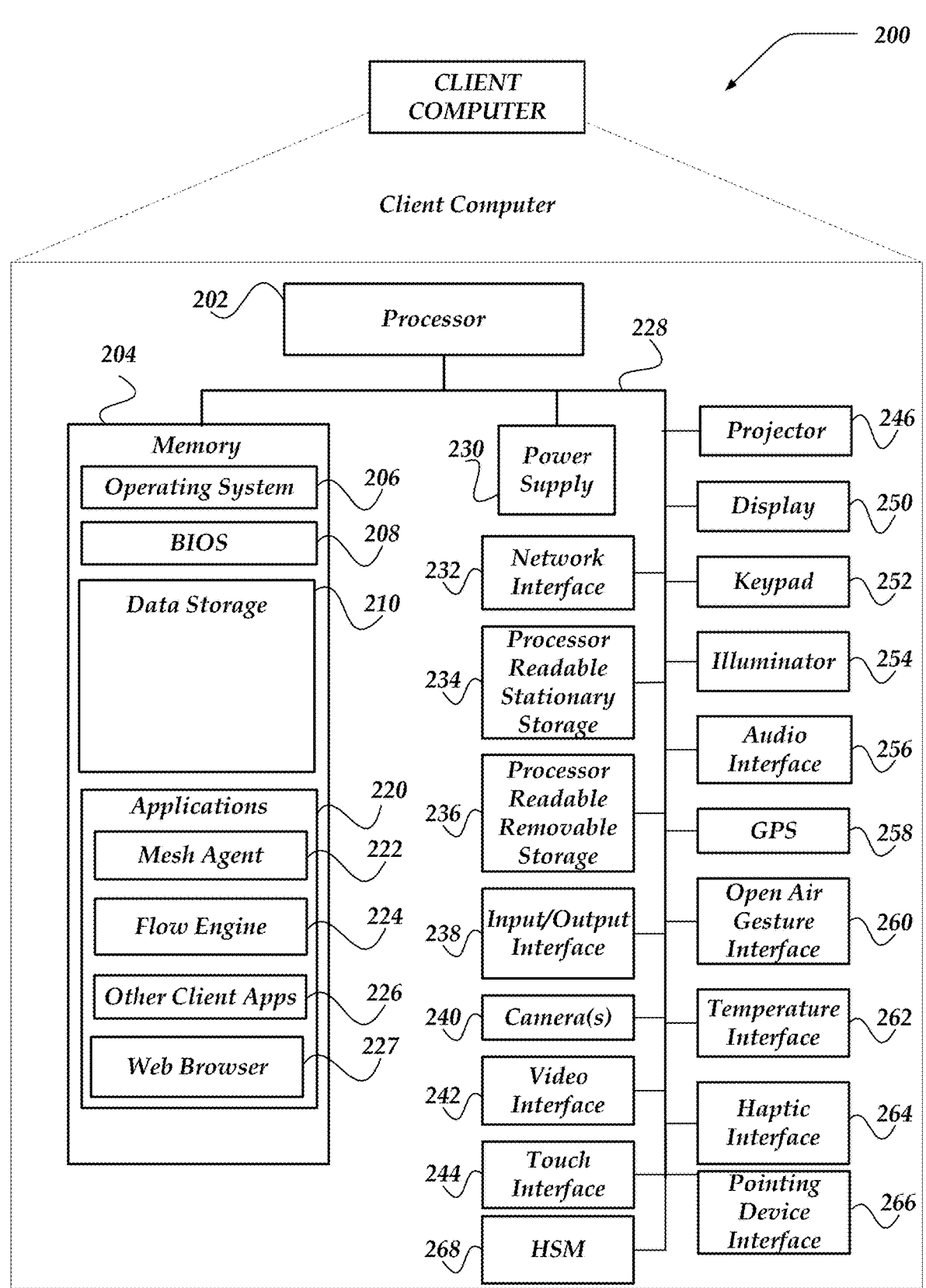
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 for measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a comple- mentary metal-oxide-semiconductor (CMOS) integrated cir- cuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is pow- ered. Also, illuminator 254 may backlight these buttons in various patterns when particular actions are performed, such as dialing another client computer. Illuminator 254 may also cause light sources positioned within a transparent or trans- lucent case of the client computer to illuminate in response to actions.

Further, client computer 200 may also comprise hardware security module (HSM) 268 for providing additional tamper resistant safeguards for generating, storing or using security/ cryptographic information such as, keys, digital certificates, passwords, passphrases, two-factor authentication informa- tion, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and micro- phone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sen- sors, current sensors, frequency sensors, and so on), moni- toring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a tempera- ture changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordi- nates of client computer 200 on the surface of the Earth, which typically outputs a location as latitude and longitude values. GPS transceiver 258 can also employ other geo- positioning mechanisms, including, but not limited to, tri- angulation, assisted GPS (AGPS), Enhanced Observed Time Difference (E-OTD), Cell Identifier (CI), Service Area Iden- tifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, pro- vide other information that may be employed to determine a physical location of the client computer, including for example, a Media Access Control (MAC) address, IP address, and the like.

Human interface components can be peripheral devices that are physically separate from client computer 200, allow- ing for remote input or output to client computer 200. For example, information routed as described here through human interface components such as display 250 or key- board 252 can instead be routed through network interface 232 to appropriate human interface components located remotely. Examples of human interface peripheral compo- nents that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image pro- jected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXten- sible Markup Language (XML), HTML5, and the like.

Memory 204 may include RAM, ROM, or other types of memory. Memory 204 illustrates an example of computer- readable storage media (devices) for storage of information such as computer-readable instructions, data structures, pro- gram modules or other data. Memory 204 may store BIOS 208 for controlling low-level operation of client computer 200. The memory may also store operating system 206 for controlling the operation of client computer 200. It will be appreciated that this component may include a general- purpose operating system such as a version of UNIX®, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by processors, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, mesh agent 222, flow engine 224, other client applications 226, web browser 227, or the like. Client computers may be arranged to exchange communications, such as, queries, searches, messages, notification messages, event messages, alerts, log data, API calls, or the like, combination thereof, with application servers. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware devices may directly execute embedded logic to perform actions. Also, in one or more embodiments (not shown in the figures), client computer 200 may include one or more hardware microcontrollers instead of CPUs. In one or more embodiments, the microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Network Computer

Figure 3:
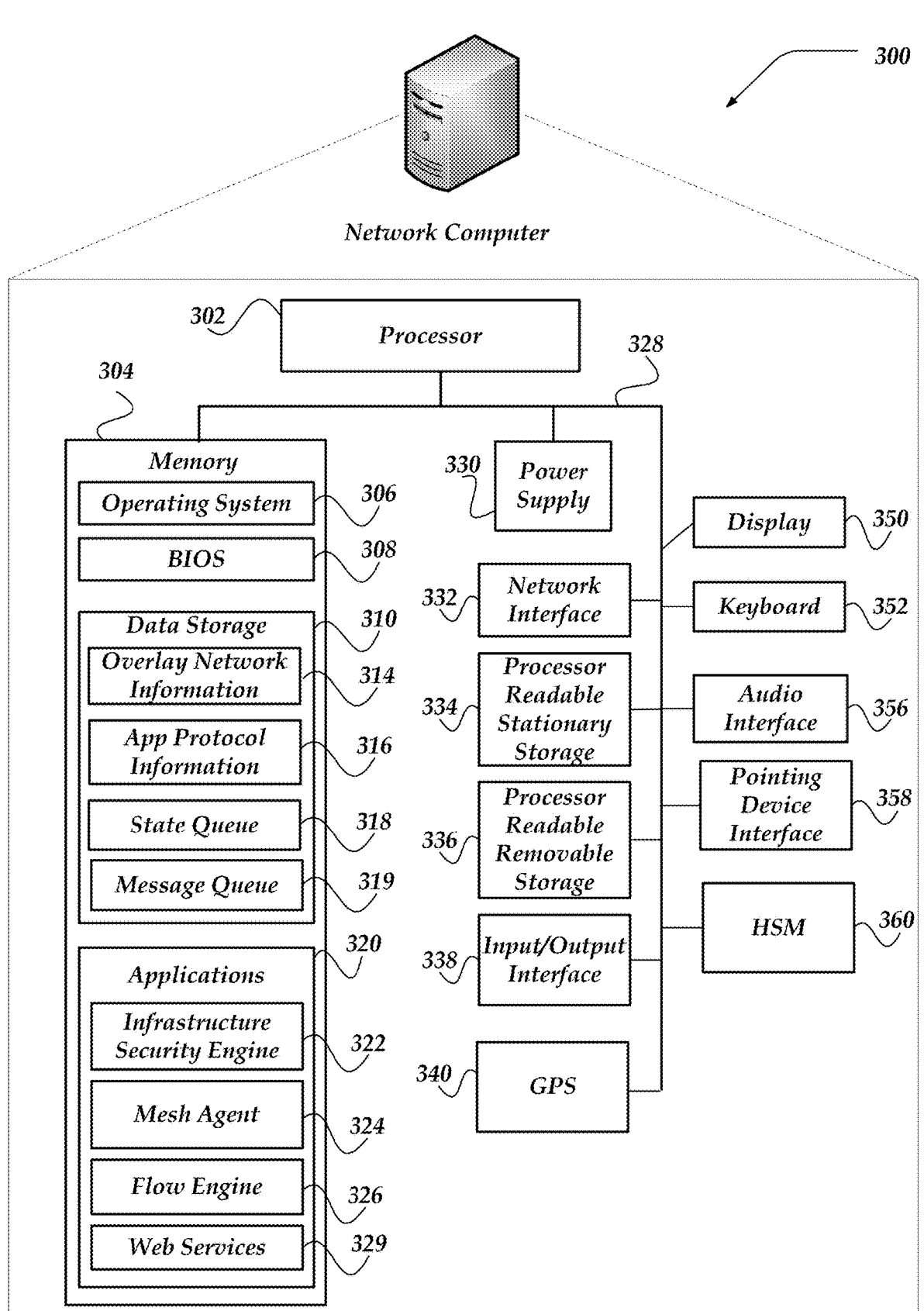
FIG. 3 illustrates a schematic embodiment of a network computer.

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, infrastructure security computer 118, or mesh agent computers 120 in FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiment, however, network computer 300 may, through other components, provide other information that may be employed to determine a physical location of the client computer, including for example, a Media Access Control (MAC) address, IP address, and the like.

In at least one of the various embodiments, applications, such as, operating system 306, infrastructure security engine 322, mesh agent 324, flow engine 326, web services 329, or the like, may be arranged to employ geo-location information to select one or more localization features, such as, time zones, languages, currencies, calendar formatting, or the like. Also, localization features may be used when interpreting network traffic, application protocols, modifying/localizing client requests, modifying/localizing server responses, user-interfaces, generating reports, monitoring infrastructure access in different regions, or the like. Localization may be employed by one or more internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX®, or Linux®, or a specialized operating system such as Microsoft Corporation's Windows® operating system, or the Apple Corporation's IOS operating system. Operating systems may include, or interface with a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, overlay network information 314, application protocol information 316, activity logs 318, frame capture logs 319, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include infrastructure security engine 322, mesh agent 324, flow engine 326, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, infrastructure security engine 322, mesh agent 324, flow engine 326, web services 329, or the like, may be operative in a cloud-based computing environment. In one or more of the various embodiments, these applications, and others may be executing within virtual machines or virtual servers that may be managed in a cloud-based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to infrastructure security engine 322, mesh agent 324, flow engine 326, web services 329, or the like, may be provisioned and de-commissioned automatically.

Also, in one or more of the various embodiments, infrastructure security 322, mesh agent 324, flow engine 326, web services 329, or the like, may be located in virtual servers running in a cloud-based computing environment rather than being tied to one or more specific physical network computers. Likewise, in some embodiments, one or more of infrastructure security engine 322, mesh agent 324, flow engine 326, web services 329, or the like, may be configured to execute in a container-based environment.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security modules may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of CPUs. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
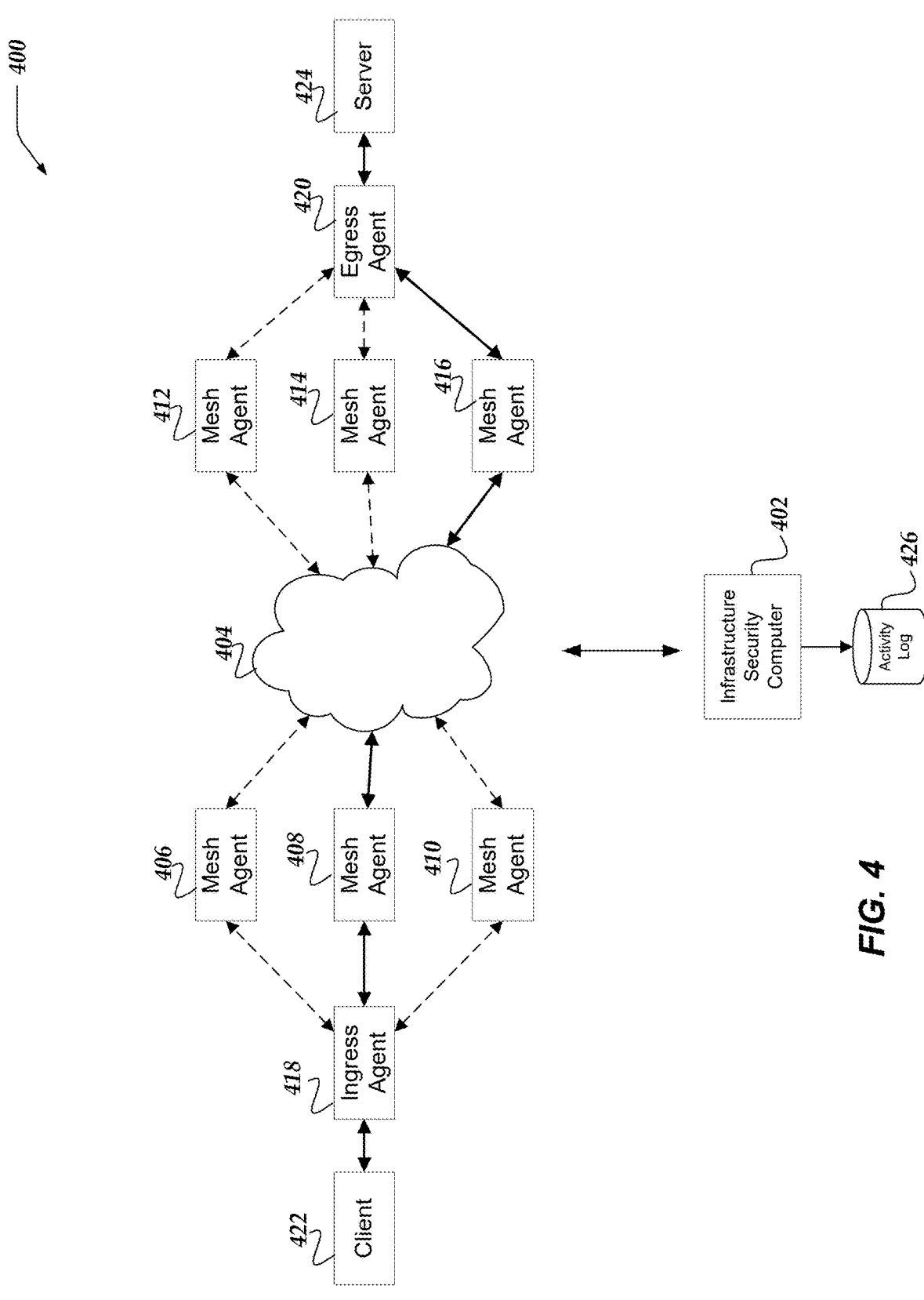
FIG. 4 illustrates a logical architecture of a system for fine-grained security policy enforcement for applications in accordance with one or more of the various embodiments.

FIG. 4 illustrates a logical architecture of system 400 for fine-grained security policy enforcement for applications in accordance with one or more of the various embodiments. In some embodiments, system 400 may comprise: one or more infrastructure security computers, such as, infrastructure security computer 402; one or more networks, such as, network 404; one or more mesh agents, such as, mesh agents 406-410 or mesh agents 412-416; one or more edge agents, such as, ingress agent 418 or egress agent 420; one or more clients, such as, client 422 or client 424; one or more activity log data stores, such as, activity log 426; or the like.

Note, one or more portions of system 400 illustrates a non-limiting example of a software defined network system or overlay network system. One of ordinary skill in the art will appreciate that other mesh network architectures or overlay network management schemes may be employed without departing from the scope of the innovations disclosed herein. However, the description of system 400 is sufficient for enabling one of ordinary skill in the art to understand the innovations disclosed herein.

In one or more of the various embodiments, mesh agents may be arranged to provide a software-defined overlay network that runs on one or more conventionally configured/provisioned physical (underlay) networks. In some embodiments, if a client application attempts to access resources managed by an infrastructure security service, the mesh agent used by clients to gain access to resources in a managed environment may be considered an ingress agent.

Similarly, mesh agents that enable resource servers to respond to client request via the overlay network may be considered to be egress agents. Accordingly, in some cases mesh agents may be considered to be ingress agents in some contexts and they may be considered to be egress agents in other contexts. The different nomenclature is used herein as a convenience to describe features of embodiments in the different contexts.

In one or more of the various embodiments, infrastructure security computers, such as, infrastructure security computer 402, may host one or more infrastructure security engines that enforce policies for a secure overlay network that provides managed access to one or more resources (or endpoints) in a networked environment.

In one or more of the various embodiments, if a client employs a mesh agent, such as, ingress agent 418, the ingress agent may be arranged communicate with infrastructure security computer 402 to authenticate the client request and determine a network path from the client to the target resource server via the overlay network.

In one or more of the various embodiments, mesh agents may be arranged to determine a next 'hop' to a next mesh agent. Accordingly, the next mesh agent, as well as, other mesh agents, may determine the next hop to a next mesh agent. Eventually, in some embodiments, the communication or request may reach an egress agent for the target resource server. And, in some embodiments, if each intervening mesh agent validates or authenticates the client communication, the client communication may reach the intended target resource server.

In one or more of the various embodiments, if an ingress agent receives a client request, the ingress agent may send a communication to an infrastructure security computer, such as, infrastructure security computer 402 to determine one or more authorized routes through the overlay network to reach the target resource server. In some embodiments, routes through the overlay network may be considered to be overlay paths or secure tunnels that go from mesh agent-to-mesh agent until the target server may be reached.

In one or more of the various embodiments, mesh agents may establish a cryptographically secure virtual network tunnel between clients and servers such that the client/server traffic may be opaque to observers or other network devices that may be unaffiliated with the infrastructure security computer.

Note, one of ordinary skill in the art will appreciate that system 400 may comprise one or more network devices, network computers, routers, switches, or the like, that comprise the underlay network. For brevity and clarity, the underlay network components are omitted from FIG. 4.

In one or more of the various embodiments, mesh agents may be considered to be hosted on physical or virtual computers that have access to the underlay networks. Also, in some embodiments, the number of overlay network hops (between/via mesh agents) between endpoints may be different than the actual network hops required by the underlay network. For example, for some embodiments, system 400 shows one overlay hop to get from ingress agent 418 to mesh agent 408. However, in some cases, there may be multiple hops in the underlay network (not shown) to exchange network traffic between ingress agent 418 and mesh agent 408. For example, in some embodiments, one hop in the overlay network may traverse one or more sub-networks that may require multiple hops through multiple underlay network routers.

In one or more of the various embodiments, if a client provides a request to communicate with a managed endpoint (e.g., resource server 424), the corresponding ingress agent (e.g., ingress agent 418) forwards information about the request to an infrastructure security computer (e.g., infrastructure security computer 402). Accordingly, in some embodiments, an infrastructure security engine (hosted on the infrastructure security computer) may be arranged to determine if the client user has permission to communicate with the target endpoint. Also, in some embodiments, the infrastructure security engine may be arranged to determine one or more next mesh agents where the ingress agent may forward the client request. Accordingly, in some embodiments, infrastructure security engines may be arranged to generate an overlay route table that includes one or more available mesh agents that may be candidates that may be suitable and authorized for handling the communication.

In some embodiments, the communication may be forwarded to subsequent mesh agents, each intervening mesh agent may be arranged to validate and authenticate the client communication using the infrastructure security engine. In some embodiments, if the client communication may be authorized, the infrastructure security engine may provide an overlay route table that identifies one or more mesh agents for the next hop through the overlay network.

In this example, the overlay path determined for client 422 to communicate with server 424 is ingress client 418 to mesh agent 408 to mesh agent 416 to egress agent 420 and ultimately to server 424. At the final mesh agent (e.g., egress agent 420), the egress agent may determine/obtain the credentials that enable access to the server. In some embodiments, egress agents may be arranged to communicate with an infrastructure security computer to obtain credentials for a server. In this example, the connections (double-arrow lines) illustrated with solid lines represent the determined route through the overlay network. In contrast, the connections (double-arrow lines) illustrated using dashed lines represent mesh agents that may be part of the overlay network that were not selected for a particular communication between client 422 and server 424.

In one or more of the various embodiments, ingress agents, egress agents, or mesh agents may be configured to capture or record activity that may be associated with the communication through the secure tunnel. In this example, for some embodiments, activity log data store 426 represents a data store for storing logged or recorded activity for managed infrastructure. In some embodiments, infrastructure security engines may be arranged to enable different types of activity logging. In some embodiments, infrastructure security engines may be configured to record one or more of the user information associated with an action, occurrence of actions, the accompanying application payload (if any), response from servers, or the like. Further, in some embodiments, infrastructure security engines may enable log information to be forwarded to another data store for storage or archival.

In one or more of the various embodiments, infrastructure security engines may be arranged to generate authenticity tokens that may act as a fingerprint for activity that may occur during the secure tunnel session. In one or more of the various embodiments, authenticity tokens may be generated based on the payload content, user identities, client identities, or the like, that may be associated with an overlay session. For example, if the secure tunnel session includes a response to a query, the authenticity token may be generated based on a hash of the response to the query. Among other things, in some embodiments, authenticity tokens may be employed as part of a scheme to determine the authenticity activity log information that may be stored elsewhere.

Figure 5:
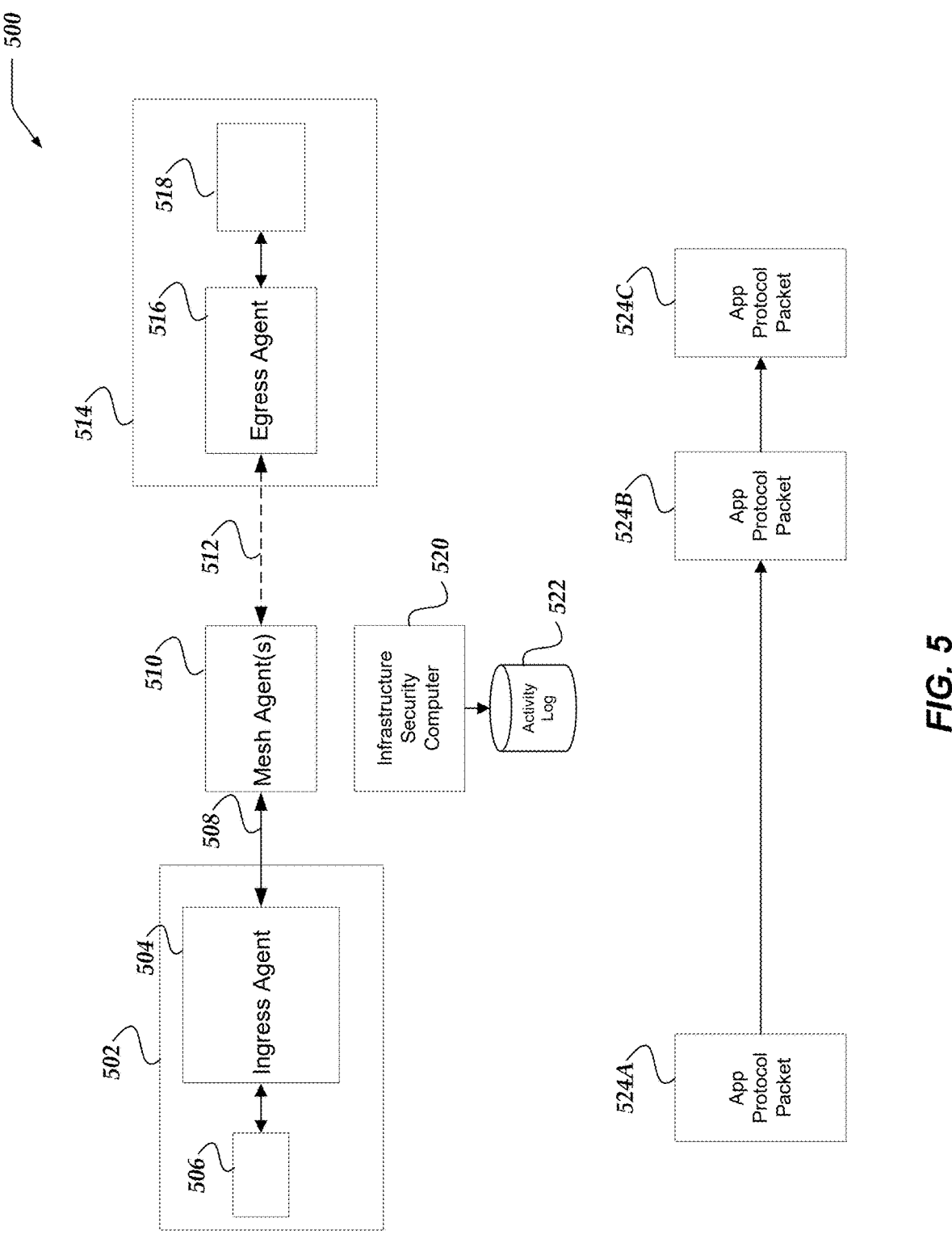
FIG. 5 illustrates a logical schematic of a system for fine-grained security policy enforcement for applications in secured networks in accordance with one or more of the various embodiments.

FIG. 5 illustrates a logical schematic of system 500 for fine-grained security policy enforcement for applications in secured networks in accordance with one or more of the various embodiments. in this example, for some embodiments, system 500 includes client computer 502, ingress agent 504, client application 506, mesh agent(s) 510, target resource computer 514, egress agent 516, resource server 518, infrastructure security server 520, log data store 522. Note, in some embodiments, ingress agents may be considered mesh agents that a client application employs to communicate via an overlay network. Similarly, in some embodiments, egress agents may be considered mesh agents that communicate with server applications. Note, as mentioned above, ingress agents and egress agents may be considered mesh agents that may provide ingress or egress of traffic in the overlay network. Thus, for brevity and clarity mesh agents may be referred to as ingress agents, egress agents, or mesh agents depending on their immediate role in an overlay communication session.

In this example, for some embodiments, network path 508 may represent communication over a single overlay network hop of a secure tunnel that may comprise one or more underlay network hops to reach the computer that is hosting mesh agent 510. Likewise, network path 512 may represent one or more overlay network hops (intervening mesh agents not shown) that reach target computer 514 and egress agent 516.

As described above, in some embodiments, mesh agents may be arranged to communicate with infrastructure security engines that may be hosted on infrastructure security computers, such as, infrastructure security computer 520. Also, in some embodiments, infrastructure security engines may be arranged to log overlay session activity into activity log data store 522.

In one or more of the various embodiments, client applications, such as, client application 506 may employ one or more application protocols to communicate with resource servers, such as, resource server 518. In some embodiments, application protocols may define particular data in particular arrangements or sequences that enable client applications to communicate with associated/related server applications. In some embodiments, two or more applications or services may share the same application protocol. Also, in some embodiments, one or more applications may employ unique or custom protocols to enable communication between clients or servers. In some embodiments, servers may provide one or more APIs or interfaces that enable applications to access the servers rather than requiring dedicated/proprietary client applications. In such circumstances, a program or service configured to employ such APIs or interfaces may be considered a client application.

In some embodiments, application protocol packets originating from client applications may be provided to ingress agents and subsequently forwarded through the overlay network until they reach the egress agent. Accordingly, in some embodiments, egress agents may be arranged to act as an endpoint to the connection from the client application.

In this example, for some embodiments, application protocol packet 524A represents one or more packets of network traffic that may be sent from a client application, such as client application 506. Accordingly, the application protocol packet may be routed through the overlay network until it reaches its egress agent. In this example, application protocol packet 524B represents the application protocol packet at the egress agent for the client request. And, in this example, for some embodiments, application protocol packet 524(A, B, C) represents application protocol packets sent from an egress agent to the target resource server.

In one or more of the various embodiments, mesh agents including ingress agents or egress agents may be arranged to re-write application protocol packets to enforce one or more policies in the overlay network. For example, if an application protocol defines one or more fields for holding credential information, a policy may be provided such that egress agents may be arranged to insert the appropriate credential information into the application protocol packets before communicating them to the target resource server. Thus, in some embodiments, credential information provided by the client (if any) may be automatically replaced by other credential information determined by the egress agent as directed by its infrastructure security computer.

Accordingly, in some embodiments, egress agents may be arranged to communicate with infrastructure security computers to obtain credential instructions that declare one or more actions the egress agent may perform to obtain or activate credential information to access the target resource server. In some embodiments, egress agents may be arranged to replace the credential information included in application protocol packet 524B (if any) with credential information determined based on credential instructions provided by its associated infrastructure security computer. Further, in some embodiments, egress agents may be arranged to perform one or more 'fix-up' operations on application protocol packet 524B, such as, computing hash signatures based on packet content, adjusting packet size field values, adjusting sequence numbers, adjusting packet offset/pointer values (e.g., values that point to the location of particular values or sections in a given packet), or the like. Accordingly, in some embodiments, application protocol packet 524C represents a modified packet that includes credential information as well as other packet modifications that may be required for a particular application protocol or credential mechanism.

Figure 6:
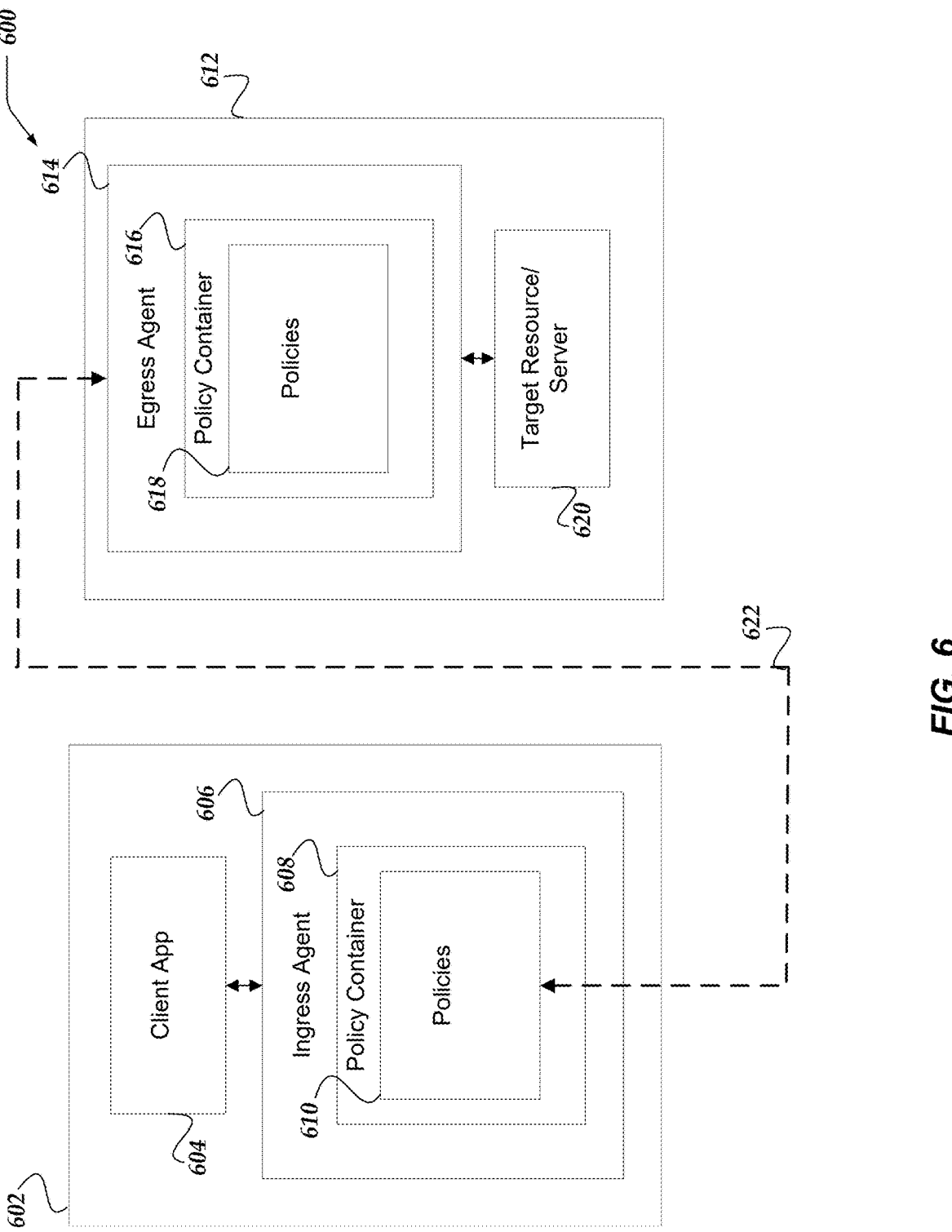
FIG. 6 illustrates a logical schematic of a system for fine-grained security policy enforcement for applications in accordance with one or more of the various embodiments.

FIG. 6 illustrates a logical schematic of system 600 for fine-grained security policy enforcement for applications in accordance with one or more of the various embodiments. In some embodiments, systems, such as, system 600 may include client computer 602, client application 604, ingress agent 606, policy container 608, policies 610, network computer 612, egress agent 614, policy container 616, policies 618, target resource server 620, or the like. Further, in this example, path 622 represents a network connection between client computer 602 and network computer 612 as facilitated by ingress agent 606 and egress agent 614.

As described above, in one or more of the various embodiments, ingress agents and egress agents may be arranged to establish a secure network path between a client application, such as, client application 604 and target resources, such as, target resource 620.

As described above, mesh agents, including, ingress agents or egress agents may be enabled to inspect or modify network traffic exchanged between client applications and protected target resources. Accordingly, in some embodiments, mesh agents may be arranged to employ one or more policies included in policy containers that may include rules, instructions, parsers, grammars, or the like, directed to one or more application protocols that particular client applications and target resources may employ to communicate.

Herein, for brevity and clarity, network traffic, such as, traffic over connection 622 may be referred to as requests or responses such that clients may send/provide requests and target resources may send/provide responses. One of ordinary skill in the art will appreciate that the requests or responses may be part of ongoing/continuous sessions rather than being limited to strict one-for-one exchanges of requests and responses. For example, policies may be applied to data packets that comprise streaming video, streaming data, streaming audio, or the like.

In one or more of the various embodiments, particular policies for particular application protocols may be included in policy containers, such as, policy container 608 and policy container 616. In some embodiments, policy containers may be arranged to include one or more policies that declare access rules for one or more resources or network segments.

In some embodiments, policy containers may be associated with one or more application protocols, applications, or the like. For brevity, policy containers may be described as being associated with activities. For example, a policy container may be associated with HTTP traffic while another policy container may be associated with a database application. Accordingly, in some embodiments, policies in a given policy container may be directed to enforcing policies on for a particular activity. Note, one of ordinary skill in the art will appreciate that the definition or declaration of an activity may vary depending on local requirements or local circumstances. Accordingly, in some embodiments, infrastructure security computers may provide user interfaces or configuration information that enable administrators of overlay networks to have broad authority to define or declare activities that may be relevant.

Figure 7:
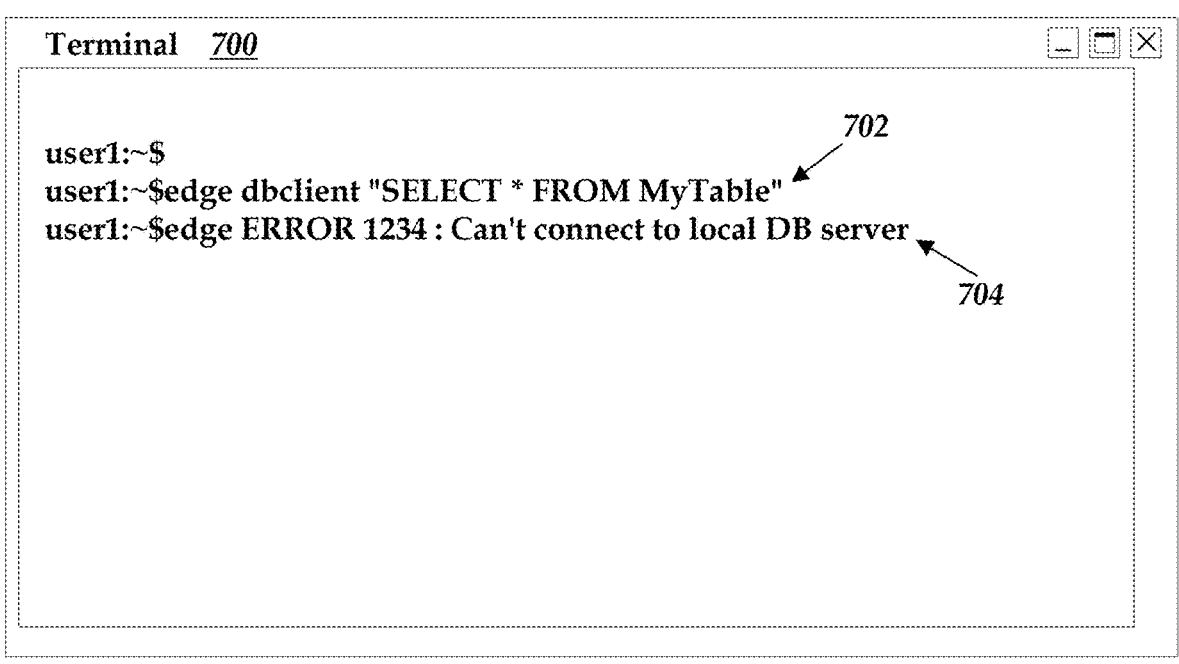
FIG. 7 illustrates a logical schematic of a terminal and shortcut 706 for fine-grained security policy enforcement for applications in accordance with one or more of the various embodiments.

FIG. 7 illustrates a logical schematic of terminal 700 and shortcut 706 for fine-grained security policy enforcement for applications in accordance with one or more of the various embodiments. In some embodiments, terminal 700 may represent a computer terminal application that enables users access to command-line interfaces for various applications. In this example, for some embodiments, command line 702 represents a command line that may be provided by a user. In this example, the user is attempting to retrieve data from a remote database using the program dbclient. In the example, the command 'dbclient' is shown as prefixed by the command 'edge'. Accordingly, in this example, the prefix represents a command to employ an ingress agent to execute the dbclient. Accordingly, in this example, rather than routing the dbclient command via the conventional underlay network, the ingress agent may capture the execution of dbclient and employ the overlay network to establish a secure tunnel for the requested operation.

Similarly, in some embodiments, shortcut 706 illustrates how a shortcut for a GUI based operating system or window manager may be configured to route commands initiated from a desktop (e.g., mouse-clicks) through secure tunnels in the overlay network. In this example, shortcut 706 includes an application display name, such as, display name 708 and a launch/execution command represented by target 710. Thus, in this example, shortcuts may be configured to enable launched applications to access the overlay network.

Note, often client applications may support users providing server identifiers (e.g., URIs, IP addresses, hostnames, or the like) that declare the server that for the client application. For example, a conventional command to launch a dbclient application may include the hostname where the database server of interest is located. However, for resources in the overlay network, the infrastructure security engines may determine the location of the server.

Figure 8:
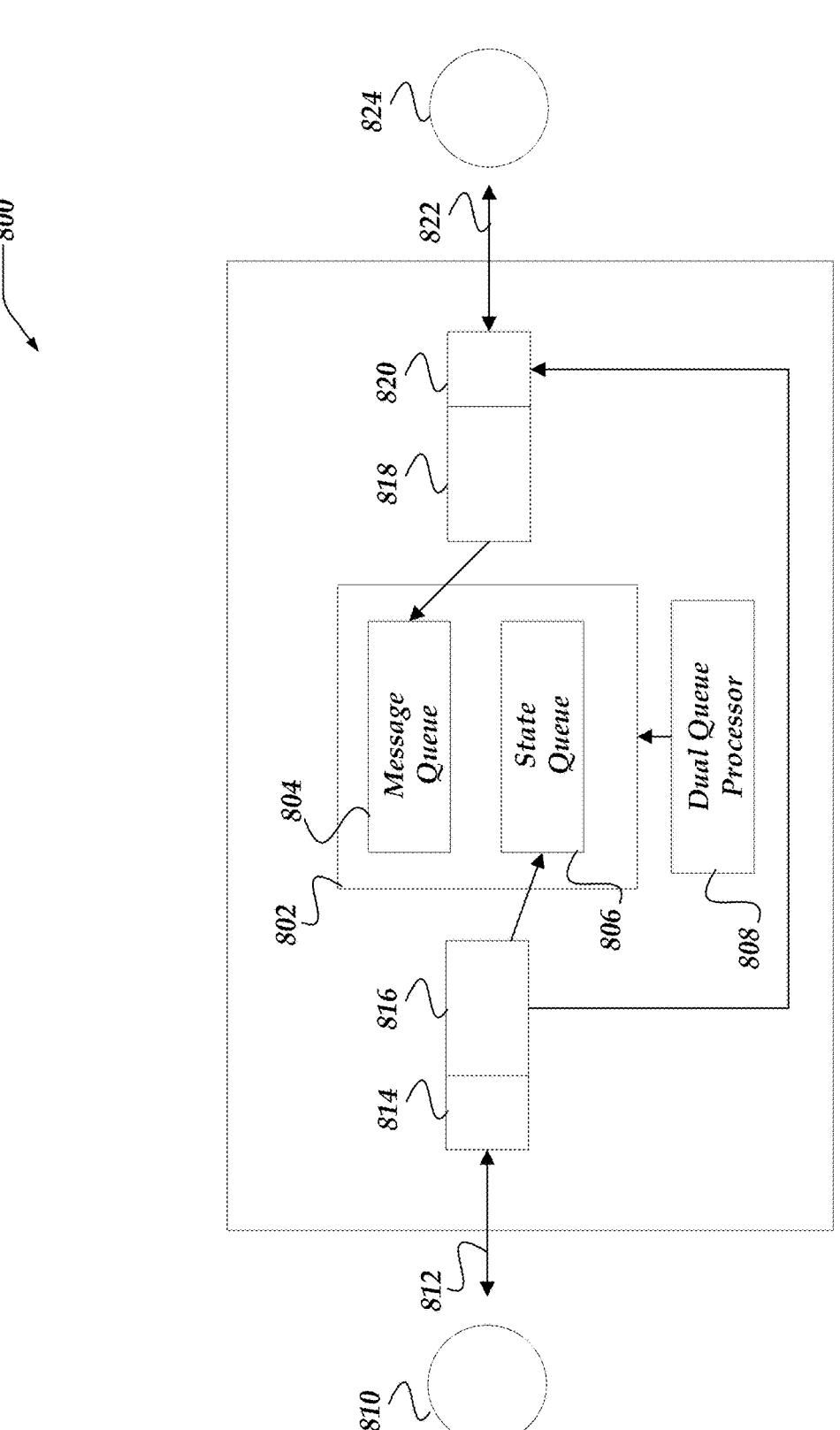
FIG. 8 illustrates a logical schematic of a system for fine-grained security policy enforcement for applications in accordance with one or more of the various embodiments.

FIG. 8 illustrates a logical schematic of system 800 for fine-grained security policy enforcement for applications in accordance with one or more of the various embodiments. In some embodiments, mesh agents or other computer may include systems (or portions thereof), such as system 800. Accordingly, in some embodiments, system 800 may be arranged to include one or more dual queues, such as dual queue 802. In some embodiments, dual queues may be established for each pending application session. Dual queues may include message queues, such as message queue 804 and state queues, such as state queue 806. In some embodiments, flow engines may provide one or more dual queue processors, such as dual queue processor 808.

In one or more of the various embodiments, clients, such as client 810 may be communicatively coupled with system 800 via network connections, such as network connection 812. Accordingly, in some embodiments, message from clients (e.g., client requests) may be received at a protocol handler, such as protocol handler 814. In some embodiments, protocol handlers, such as protocol handler 814 may be arranged to interpret communication/transport protocols to determine the application protocol traffic that may be included in the client messages.

In some embodiments, client messages processors, such as client message processor 816 may be arranged to perform various actions, including: ensuring that client message may be authorized; determining if the client message should be modified before forwarding to the target server; included and stored in a state element that may be stored in the state queue; forwarded to the target server; determining if additional/associated state elements may be added to the state queue; or the like.

In some embodiments, messages received from servers, such as server 824 may be provided to system 800 via network connections such as network connection 822. Also, similar to client messages, in some embodiments, incoming server messages may be provided to a protocol handler, such as protocol handler 820 which may be arranged to interpret the communication/transport protocol to determine the application protocol traffic that may be carried by the transport protocol traffic such that the application protocol traffic may be provided to server message processor 818.

In some embodiments, server message process 818 may be arranged to generate a message queue element that includes the server messages which may be enqueued in message queue 804.

Further, in some embodiments, dual queue processors, such as dual queue processor 808 may be arranged to monitor state queue 806 and message queue 804. Accordingly, in some embodiments, dual queue processor 808 may be arranged to check if state queue 806 may be empty which may enable the server message to be forwarded directly to client 810. Also, in some embodiments, if there may be one or more state elements in state queue 806, dual queue processor 808 may be arranged to read one or more state elements to determine the current state of the pending application session. Accordingly, in some embodiments, dual queue processors may be arranged to take various actions depending on the current state. For example, if the application session may be associated with security policies instructions that require messages from the server to be modified before sending to the client, flow engines may perform such modifications. Also, for example, such security policy instructions may be executed to perform actions, including omitting/discarding messages, sending additional messages to the client, or the like. In some cases, for some embodiments, modification instructions may be provided for by infrastructure security computers, or the like, during the authorization or validation of the client messages that initiate that application session.

Also, in some cases, more than one transport protocol packet may be required for a single application protocol message if the size of an application protocol packet exceeds the payload capacity of the transportation protocol packets. Accordingly, in some embodiments, protocol handlers may be arranged to include parsers, or the like, that may enable application protocol messages to be determined from one or more transport protocol packets or to enable application protocol messages to be included in transport protocol packets for transmission over the network.

In some embodiments, application sessions may be defined based on the target application. Accordingly, in some embodiments, one or more network connections with a client may be associated with the same state queue message queue pair. Likewise, in some embodiments, one or more network connections with the target application server may be associated with the same state queue message queue pair. Likewise, in some cases, for some embodiments, a single network connection from a client and a single connection to the target application server may be associated with a state queue message queue pair.

In some embodiments, flow engines may be arranged to include meta-data associated with the application session in state queue elements or message queue elements. In some embodiments, this meta-data may include one or more instructions or rules that may be associated with the security policies that may be associated with the application session. Also, in some embodiments, meta-data may include time-stamps, check-sums, sequence numbers, or the like, that may be employed to improve the management of the communication flow of the application session.

In some embodiments, if other application sessions may be initialized for the same or different application servers, flow engines may be arranged to generate additional state queue and message queue pairs to service the other application sessions (not shown). Also, in some embodiments, depending on the associated application or application protocol, one or more network connections may be associated with the same state queue message queue pair.

As described above, if a client sends a request to an application server in the managed overlay network, mesh agents may be arranged to communicate with its infrastructure security computer to authenticate the user and validate the request. In some embodiments, this may include determining any policies that may be associated with the request, the user, the application, the network, or the like. In some cases, for some embodiments, there may be particular policy rules that may be applied based on the details of the client request or the application server. In some embodiments, if the request is disallowed by the infrastructure security computer outright, the request may be discarded before providing it to the flow engine. Also, in some embodiments, infrastructure security computers may determine the routing information, credential information, logging rules, redaction rules, or the like, based on the policies that may be applied to the request. Accordingly, in some embodiments, it may generally be assumed that requests, users, or the like, may be vetted by an infrastructure security computer, or the like, before the application protocol messages may be provided to flow engines.

As described above, in some embodiments, flow engines may be arranged to generate dual queues each with a state queue and a message queue for each application session. Accordingly, in some embodiments, if a new application session may be initiated, flow engines may be arranged to generate another state queue and another message queue.

In some embodiments, one or more message elements may be associated with application server messages that may be sent in response to application requests from clients that may be associated with state elements. Also, in some embodiments, one or more message elements may be associated with other application protocol messages provided by application servers that may be unassociated with client application requests or state elements, including, warning messages, error messages, status messages, or the like, that may not be sent in response to client requests.

In some embodiments, flow engines may employ data structures that include rules, instructions, state maps, or the like for managing or validating application protocols. For brevity and clarity these data structures may be referred to as protocol maps. In some embodiments, protocol maps may include protocol information used by flow engines to evaluate the sequence or contents of application protocol messages or application protocol requests. Accordingly, in some embodiments, flow engines may be enabled to monitor communication of clients or applications to determine if the communication conforms to the application protocol being used for the application session. Thus, in some embodiments, flow engines may be arranged to track communication that occurs during the application session to identify out of order messages, erroneous messages, or otherwise anomalous messages. For example, in some embodiments, if a comprised client application sends out-of-order or otherwise incorrect or unexpected messages, the flow engines may employ protocol maps to detect them and take appropriate actions. For example, for some embodiments, flow engines may be configured terminate application sessions if malformed application protocol messages may be encountered or observed.

In some embodiments, flow engines may be arranged to be adaptable to various application protocols. Accordingly, in some embodiments, flow engines or infrastructure security computers may include one or more data stores of protocol maps to support a variety of application protocols. Also, in some embodiments, flow engines may be arranged to dynamically load protocol maps from configuration information to support additional application protocols as needed to account for local circumstances or local requirements.

Further, in some embodiments, state queue or message queues may be configured to have memory capacity limits. Accordingly, in some embodiments, state queue memory capacity restrictions may prevent incoming application messages from overloading flow engines (or the computers hosting the flow engines). For example, if a client application may be maliciously (e.g., denial of service attacks) or inadvertently generating an excessive number of application request, the state queue capacity limit may protect the flow engine or the computer hosting the flow engine from being starved of memory. Likewise, in some embodiments, messages queues may be configured to have memory capacity limits. Accordingly, in some embodiments, message queues may protect against application servers that may maliciously or inadvertently flood the network with application responses. Accordingly, in some embodiments, in addition to managing the flow order of application requests, state queues may be arranged to reduce memory consumption associated with the one or more application requests or application sessions. And, in some embodiments, in addition to managing the flow order of application responses, message queues may be arranged to reduce memory consumption associated with the one or more application responses or application sessions. In some embodiments, flow engines may be arrange terminate application sessions associated with state queues or messages queues that may be overloaded by requests or responses that may result in their memory capacity limits being exceeded. In some embodiments, flow engines may generate one or more notifications, log entries, report records, or the like, to indicate that an application session has been terminated because of overloaded state queues or message queues.

Generalized Operations

FIGS. 9-13 represent generalized operations for fine-grained security policy enforcement for applications in accordance with one or more of the various embodiments. In one or more of the various embodiments, processes 900, 1000, 1100, 1200, and 1300 described in conjunction with FIGS. 9-13 may be implemented by or executed by one or more processors on a single network computer such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based or containerized environment. However, embodiments are not so limited and various combinations of network computers, client computers, or the like may be utilized. Further, in one or more of the various embodiments, the processes described in conjunction with FIGS. 9-13 may be used for fine-grained security policy enforcement for applications in accordance with at least one of the various embodiments or architectures such as those described in conjunction with FIGS. 4-8 Further, in one or more of the various embodiments, some or all of the actions performed by processes 900, 1000, 1100, 1200, and 1300 may be executed in part by infrastructure security engine 322, flow engine 326, one or more mesh agents, such as, mesh agent 324, or the like, running on one or more processors of one or more network computers.

Figure 9:
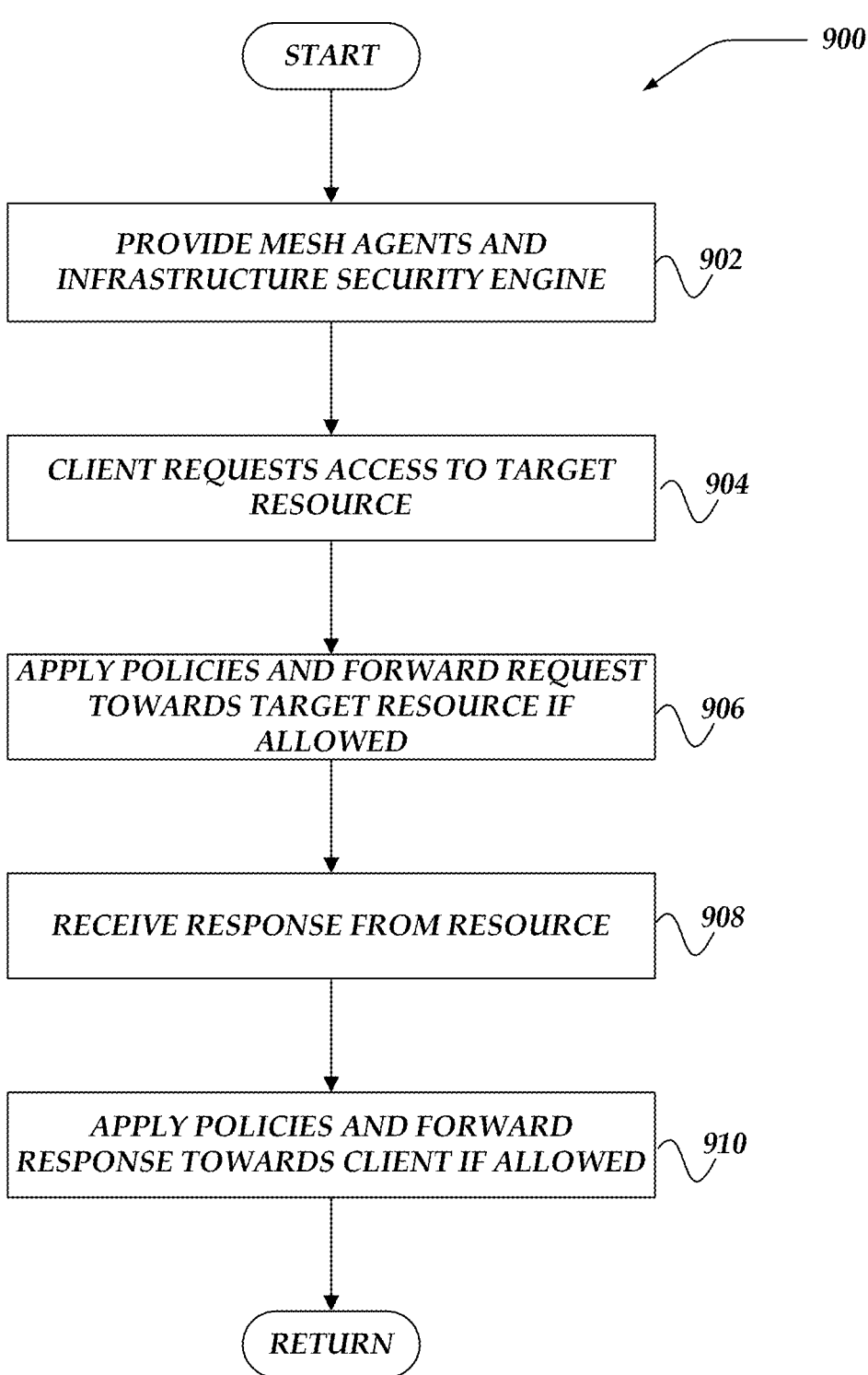
FIG. 9 illustrates an overview flowchart of a process for fine-grained security policy enforcement for applications in accordance with one or more of the various embodiments.

FIG. 9 illustrates an overview flowchart of process 900 for fine-grained security policy enforcement for applications in accordance with one or more of the various embodiments. After a start block, at block 902, in one or more of the various embodiments, one or more mesh agents and one or more infrastructure security engines may be provided. As described above, mesh agents may be deployed in an underlay network where an infrastructure security computer may be arranged to dynamically configure the mesh agents to establish an overlay network.

At block 904, in one or more of the various embodiments, clients may request access to a target resource (e.g., application servers). In some embodiments, client applications may be configured to send requests that may be routed via mesh agents to the target resource. In some embodiments, the mesh agent that may be directly communicated to by the client may be considered to be an ingress agent for the application session because it enables the client to access the overlay network.

At block 906, in one or more of the various embodiments, mesh agents may be arranged to apply one or more policies before the request may be forwarded towards the target resource if allowed by the relevant policies. As described above, infrastructure security computers may be arranged to promulgate policy information by pushing policy information to mesh agents to enforce the policies of the overlay network. In some embodiments, these policies may be enforced irrespective of how the target resource may be configured. For example, if a target resource is configured to support request-type A, a policy enforced in the overlay network may block or restrict request-type A requests. For example, if a database is enabled to allow remote users to drop tables, the overlay network may enforce a policy that disables remote users from dropping tables.

At block 908, in one or more of the various embodiments, mesh agents may be arranged to receive responses from the target resource. Similar to how clients access the overlay network, resources responding to requests may also be configured to respond via the overlay network. Accordingly, in some embodiments, target resources may communicate responses to mesh agents that enable access to a secure tunnel to the client provided by the overlay network. Note, the mesh agent that enables resources to respond to requests may be referred to as egress agents since from the point-of-view of the client, the egress agent is the mesh agent at the end of the secure tunnel that directly communicates with the target resource.

At block 910, in one or more of the various embodiments, mesh agents may be arranged to apply one or more policies and forward responses towards the clients, if allowed by the relevant policies. Responses may be forwarded to a sequence of mesh agents that form a secure tunnel between the ingress agent and the egress agent associated with the tunnel. Each intervening mesh agent as well as the ingress agent and egress agent may enforce one or more policies in the overlay network.

Next, in one or more of the various embodiments, control may be returned to a calling process.

Figure 10:
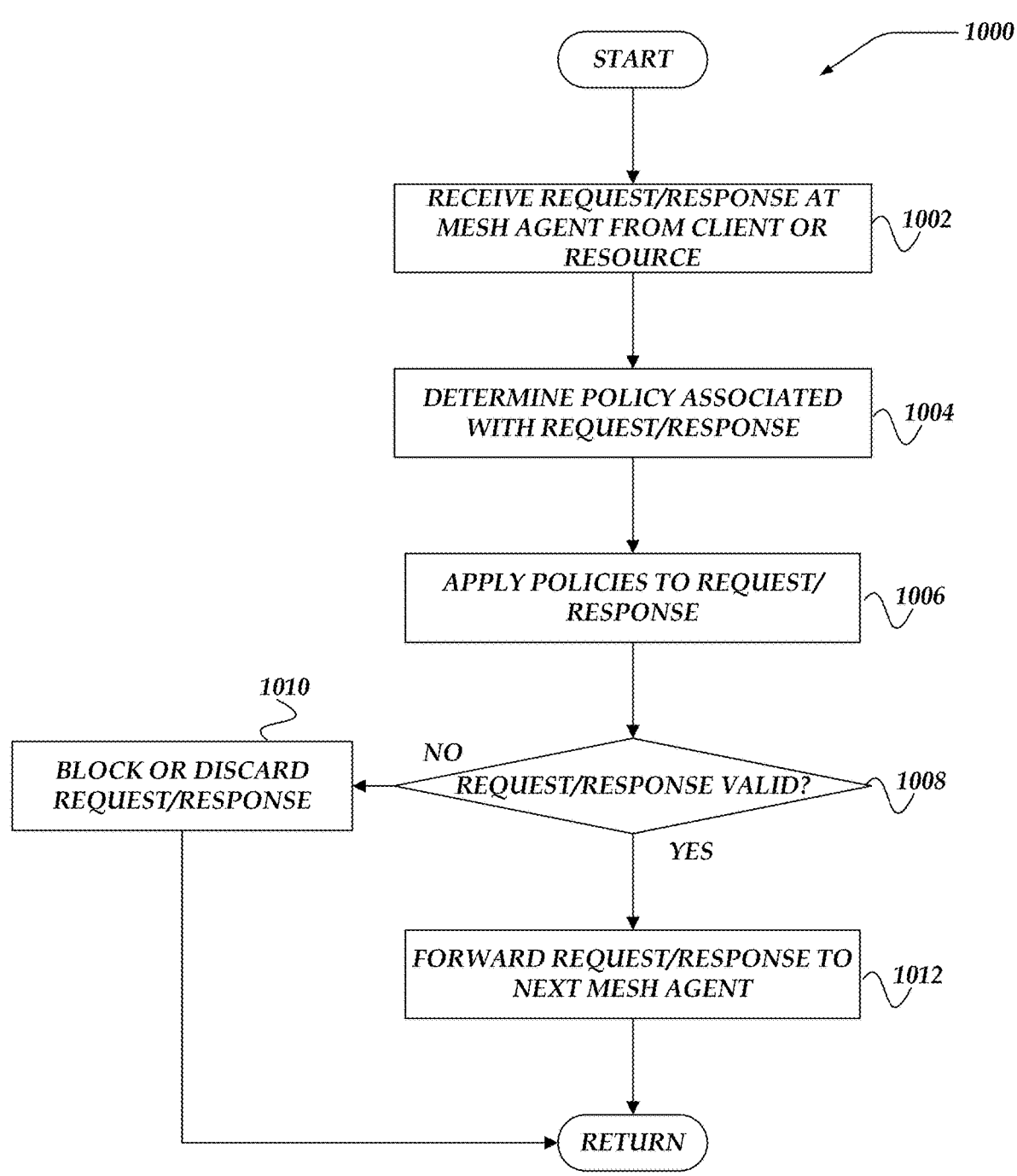
FIG. 10 illustrates a flowchart of a process for fine-grained security policy enforcement for applications in accordance with one or more of the various embodiments.

FIG. 10 illustrates a flowchart of process 1000 for fine-grained security policy enforcement for applications in accordance with one or more of the various embodiments. After a start block, at block 1002, in one or more of the various embodiments, mesh agents may be arranged to receive a request from a client or a response from a resource. In some embodiments, infrastructure security computers may provide route information for a secure tunnel in the overlay network between a client and a target resource. In some embodiments, the secure tunnel may be comprised of two or more mesh agents.

At block 1004, in one or more of the various embodiments, mesh agents may be arranged to determine one or more policies that may be associated with the request or response. In some embodiments, infrastructure security computers may be arranged to associate particular activities that may correspond to applications, application protocols, originating endpoints, resources, or the like, with one or more policies. For example, in some embodiments, a particular policy may be associated with outbound HTTP traffic. Likewise, for example, another policy may be associated with network traffic/connections to a particular database server. In some cases, a request or response may be associated with more than one policy container. For example, a request from a using a particular application protocol may be associated with a policy for the application protocol and another policy for the server type (e.g., web-server, database, or the like). For example, an HTTP associated policy may include policies that block or restrict HTTP traffic from particular servers/web-sites. While a policy associated with the underlying application may include polices that may block or restrict requests or responses that include certain SQL expressions.

At block 1006, in one or more of the various embodiments, mesh agents may be arranged to apply the one or more policies to the request/response.

In one or more of the various embodiments, policies may include one or more rules, instructions, or the like, for implementing a particular policy. In some cases, policy rules or instructions may conform to one or more standard or customized policy description languages.

In one or more of the various embodiments, policies may be associated with one or more actions or one or more identities. In some embodiments, actions of interest for a policy may be declared within the policy itself using a policy description language. In some cases, policies may include a map, dictionary, or the like, that may explicitly associate one or more policies with one or more actions or identities.

In some embodiments, actions may be associated with applications. For example, particular SQL expressions may be considered actions that may be directed towards SQL databases.

In some embodiments, identities may represent users, services, application servers, machines, or the like, that the actions may be directed by or performed on behalf of. As described above, infrastructure security computers may be arranged to assign identities to the entities (e.g., users, services, machines, application servers, or the like) that may be enabled to access overlay networks. Accordingly, in some embodiments, identities may be assigned or determined by an infrastructure security computer if a client is requesting access to a protected resource.

At decision block 1008, in one or more of the various embodiments, if the request or response may be determined to be valid, control may flow to block 1012; otherwise, control may flow to block 1010. In some embodiments, mesh agents may execute the one or more policies that may apply to the activity and identity associated with the request/response. In some embodiments, a policy may be configured to block or restrict requests/responses that do not conform to a policy. In some embodiments, if there may be two or more applicable policies, policies that block or restrict traffic may be enforced over other less restrictive policies. For example, in some cases, a first policy may be configured to mask sensitive fields in a response while a second policy may be configured to block the response. Accordingly, in this example, the mesh agent that may be applying the policies may block or restrict the response.

At block 1010, in one or more of the various embodiments, mesh agents may be arranged to block or discard the request or response. As described, in some embodiments, policies may be defined to perform a variety of actions, including validating or rejecting requests or responses. Accordingly, for brevity and clarity the innovations herein are generally described in terms of the policies validating requests/responses. However, one of ordinary skill in the art will appreciate that policies are not limited to validating requests/responses and may perform other actions, such as, data substitution, data masking, sending notifications, raising alerts, collecting metrics, or the like.

At block 1012, in one or more of the various embodiments, mesh agents may be arranged to forward the request or response to the next mesh agent. As described above, in some embodiments, mesh agents may establish a secure tunnel that "hops" from one mesh agent to another mesh agent to connect the ingress agent and the egress agent. Accordingly, in some embodiments, some or all mesh agents that comprise the secure tunnel may similarly enforce one or more policies in the overlay network.

Next, in one or more of the various embodiments, control may be returned to a calling process.

Figure 11:
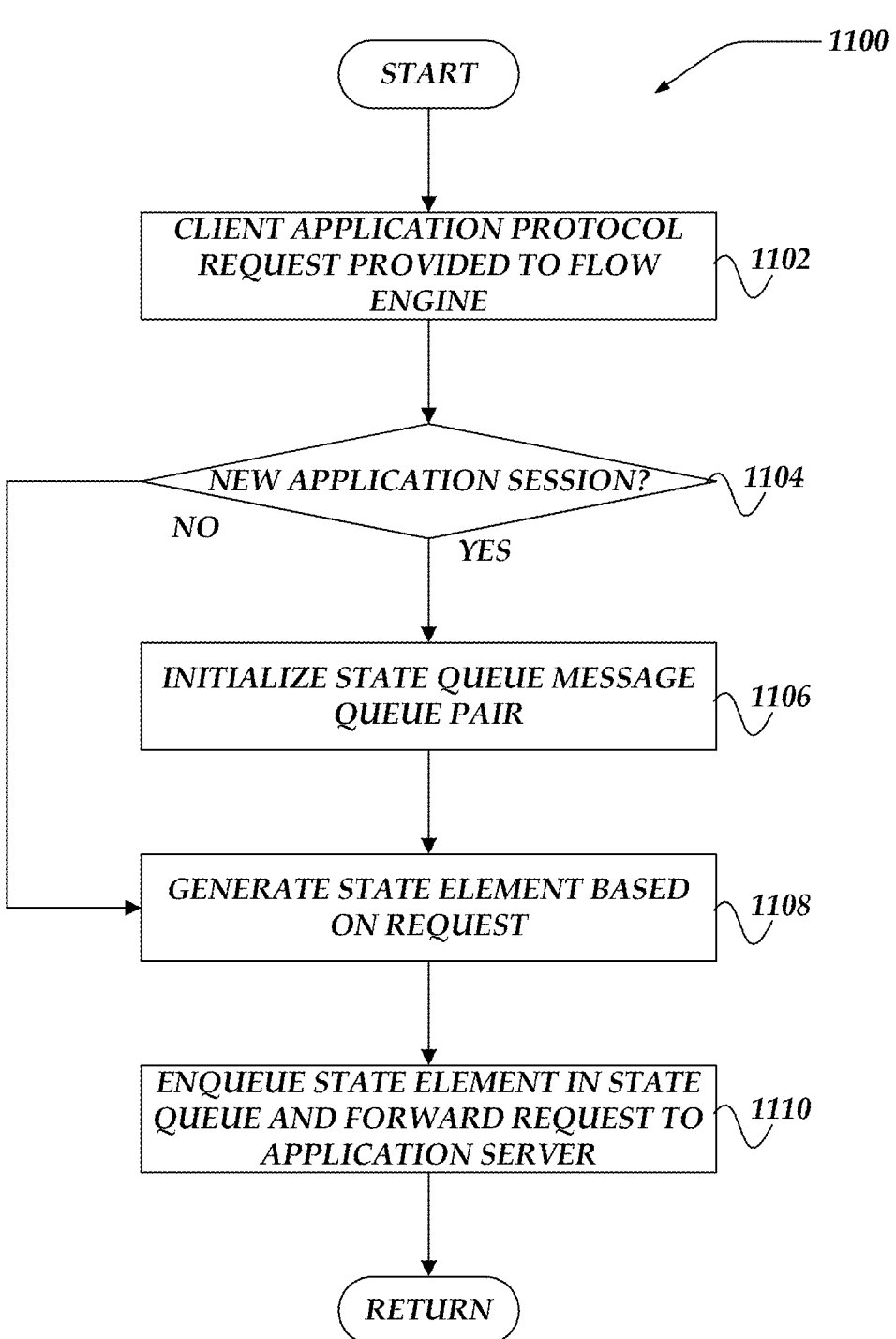
FIG. 11 illustrates a flowchart of a process for fine-grained security policy enforcement for applications in accordance with one or more of the various embodiments.

FIG. 11 illustrates a flowchart of process 1100 for fine-grained security policy enforcement for applications in accordance with one or more of the various embodiments. After a start block, at block 1102, in one or more of the various embodiments, application protocol requests from clients may be provided to flow engines. As described above, mesh agents may be arranged to capture one or more communication protocol packets (e.g., transport protocol packets) that have been routed from an ingress agent associated with the client application to the egress agent associated with an application server. In some cases, there may be one or more application protocol messages in each communication protocol packet depending on the application protocol and the communication protocol. Also, in some cases, it may require more than one communication protocol packet to obtain one application protocol message depending on the application protocol and the communication protocol.

In some embodiments, flow engines may be arranged to depend on the overlay network routing services or security services for enforcing overlay network policies that enable the client to communicate with the target resource (e.g., the application server). Accordingly, in some embodiments, communications that violate overlay network policy may be prevented from being provided to flow engines.

At decision block 1104, in some embodiments, if the request is associated with a new application session, control may flow to block 1106; otherwise, control may flow to block 1108.

In some embodiments, some applications or application protocols may support on-going or long-lived sessions. Accordingly, in some cases, for some embodiments, an application session may have been initiated by previously provided application protocol messages.

At block 1106, in some embodiments, flow engines may be arranged to initialize a state queue message queue pair for the new application session.

In some embodiments, flow engines may be arranged to manage a state queue message queue pair for each application session. Accordingly, in some embodiments, since this may be a new applications session, flow engines may be arranged to generate a new state queue and a new message queue for the application session.

At block 1108, in some embodiments, flow engines may be arranged to generate a state element based on the application protocol request.

As described above, in some embodiments, flow engines may be arranged to generate state elements for client provided application protocol messages. In some embodiments, flow engines may be arranged to employ protocol maps to determine the appropriate state names, or other protocol related meta-data for the state element. Also, in some embodiments, flow engines may be arranged to include one or more policy instructions or policy rules determined by the infrastructure security computer in the state element meta-data.

In some cases, for some embodiments, state elements may include some or all of the application protocol message that was sent by the client. In some cases, for some embodiments, flow engines may be arranged to employ the client application protocol message if evaluating responses from the application server. In some embodiments, one or more fields in the application protocol message may be employed to associate state elements with messages from the application servers, or the like. Accordingly, in some embodiments, flow engines may be arranged to selectively store one or more portions of the application message sent by the client in the state element. For example, in some embodiments, flow engines may be configured store one or more key fields of the application protocol message in the state element while discarding the payload after the application message has been sent to the application server.

At block 1110, in some embodiments, flow engines may be arranged to enqueue the state element in the state queue and forward the request to the application server. As described above, in some embodiments, flow engines may be arranged to add the state element to the message queue. Also, in some embodiments, the state element may be activated or 'opened' if it is ready to be immediately processed. Accordingly, in some embodiments, if the new state element may be only element in the state queue, the state element may be opened and the associated application protocol message may be forwarded to the application server.

In some cases, in some embodiments, another state element for the same application session may be active which may require flow engines to wait until that state may be completed before processing messages for the new state elements. However, in some cases, for some application protocols or application servers, multiple state elements may be active at the same time.

Next, in one or more of the various embodiments, control may be returned to a calling process.

Figure 12:
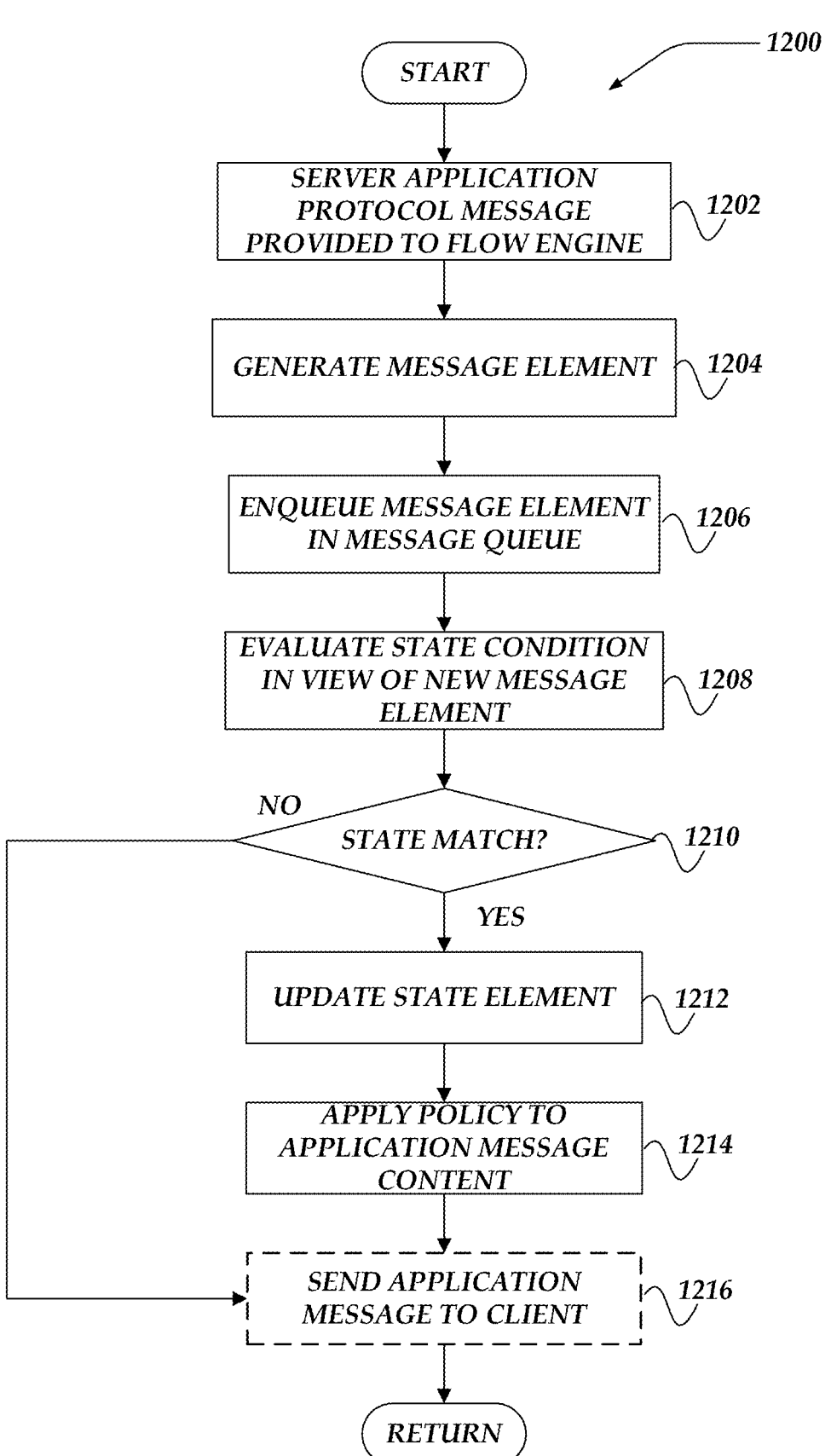
FIG. 12 illustrates a flowchart of a process for fine-grained security policy enforcement for applications in accordance with one or more of the various embodiments.

FIG. 12 illustrates a flowchart of process 1200 for fine-grained security policy enforcement for applications in accordance with one or more of the various embodiments. After a start block, at block 1202, in one or more of the various embodiments, application protocol messages from application servers may be provided to flow engines. As described above, in some embodiments, flow engines may be arranged to send application protocol messages associated with client requests to application servers. Similarly, in some embodiments, application servers may provide application protocol messages to flow engines.

In most cases, for some embodiments, application protocol messages provided by application server may be in response to client requests. For example, in some embodiments, a client may employ an application protocol message to send a query to an application server, while the application server may employ one or more application protocol messages to respond to the query from the client.

Also, in some cases, for some embodiments, application servers may send one or more application protocol messages that may or may not be responses to client requests. For example, in some cases, an application server may send status messages, error messages, warning messages, or the like, that may not be directly associated with a client request.

At block 1204, in some embodiments, flow engines may be arranged to generate message element.

As described above, message elements may be data structures that may be somewhat similar to state elements. Accordingly, in some embodiments, flow engines may be arranged to collect meta-data associated with the message, such as time stamps, source network address information, or the like. In some embodiments, flow engines may be arranged to determine the particular meta-data based on protocol maps or information/instructions provided by the infrastructure security computer.

Also, in some embodiments, flow engines may be arranged to include the application protocol message in message elements.

At block 1206, in some embodiments, flow engines may be arranged to enqueue message elements in the message queue associated with the application session.

At block 1208, in some embodiments, flow engines may be arranged to evaluate state elements in view of new message elements. In some embodiments, as message elements may be enqueued in message queues, flow engines may check if there may be relevant state elements in the state queue. In some cases, a state element may indicate that a state is open or active. In other cases, none of the enqueued state elements may be active or open. Also, in some cases, for some embodiments, the state queue may be empty of state elements.

Accordingly, in some embodiments, flow engines may be arranged to compare the message element or the message from the application server with state elements associated with active or open states to determine if the incoming message may be associated with the open states.

Likewise, in some embodiments, flow engines may be arranged to compare the message element/message from the application service with state elements that may be inactive.

Additionally, in some embodiments, flow engines may be arranged to validate that the message from the application server conforms to the current application protocol. In general, flow engines may employ protocol maps to anticipate messages (or message types) from the application server. Likewise, in some embodiments, protocol maps may include instructions or rules that indicate particular fields in the state elements or message elements that may be compared, including fields included in the application protocol request/response messages that may be compared. For example, if an application protocol uses sequence numbers, message digest hashes, security keys, user identifiers, or the like, the protocol maps may include rules to ensure that these values may be appropriate for a given session. For example, for some embodiments, if a compromised server application sends an out-of-order or non-sequitur message, the flow engine may detect it based on a comparison with the protocol map.

At decision block 1210, in some embodiments, if there may be a state element in the state queue that is associated with the new message element, control may transfer to block 1212; otherwise, control may transfer to block 1216.

At block 1212, in some embodiments, flow engines may be arranged to update the one or more state elements associated with the message element.

In some cases, a state may have one or more conditions, such as NEW, OPEN, ACTIVE, DELAYED, CANCELED, or the like. Also, in some embodiments, states may be labeled based on the application protocol being used. For example, for some embodiments, a database application protocol may include various response messages labeled 'Command Complete', 'Ready For Query', 'Data Row', 'Warning', 'Error', or the like. Accordingly, for this example, in some embodiments, a protocol map may declare state element labels or conditions that correspond to message types used by the database application.

In some embodiments, if a state element may be matched to a application server message, the protocol map may dictate that the flow engine may remove that state element from the state queue. Also, in some embodiments, for some protocols, the protocol map may dictate that the flow engine may advance a state label or state indicator of matched state element rather than removing it from the state queue. For example, for some embodiments, if the protocol map indicates that two or more messages from the application server may be required or expected for a particular client request message, the flow engine may wait for the require application messages to be received before advancing a state or removing a state element from the state queue.

At block 1214, in some embodiments, flow engines may be arranged to apply relevant policy instructions to the application message content.

In some embodiments, overlay network policies may impose requirements or restrictions on the application protocol message. For example, in some cases, an overlay network policy may restrict particular values from being provided to the client. Accordingly, in some embodiments, the matched state element may include or reference additional rules or instructions that may be executed by flow engines to modify the application protocol message before it may be sent to the client. For example, a policy may restrict fields that include personally identifiable information (PII) from being sent to some users/clients. Accordingly, in this example, the flow engine may mask one or more fields as indicated in the additional instructions included in the matched state element.

At block 1216, in one or more of the various embodiments, optionally, flow engines may be arranged to send the application message to the client.

In some embodiments, if there may be a matched state element, the application protocol message from the application server may be sent to the client as per the controlling overlay network policy.

Also, in some embodiments, if the message may be unmatched to a state element, the application message may be sent to the client. Accordingly, in some embodiments, spontaneous messages from the server may be forwarded absent an associated state or state elements. As described above, typically, these may be status messages, client pings/keep-alive-checks, error conditions, reports of exceptions or crashes, or the like.

However, in some embodiments, protocol map rules or overlay network policy rules may indicate that one or more of these types of the message be discarded or otherwise not sent to the client. For example, in some embodiments, some spontaneous server messages may be blocked or discarded for performance/convenience reasons rather than being automatically forwarded to clients.

Also, in some embodiments, one or more spontaneous server message may include information that may be deemed to be a security risk or security leak. For example, if the spontaneous server message includes network infrastructure information (e.g., network address), sensitive geographic information, sensitive timing/timestamp information, application version information, or the like, protocol maps or overlay network policies may be configured to discard those messages or mask the sensitive information.

In some embodiments, if an application protocol message may be sent to the client, the corresponding message element (if any) may be removed from the message queue.

Note, this block is indicated as being optional, because in some cases application protocol messages from application servers may be suppressed or discarded rather than being sent to clients.

Next, in one or more of the various embodiments, control may be returned to a calling process.

Figure 13:
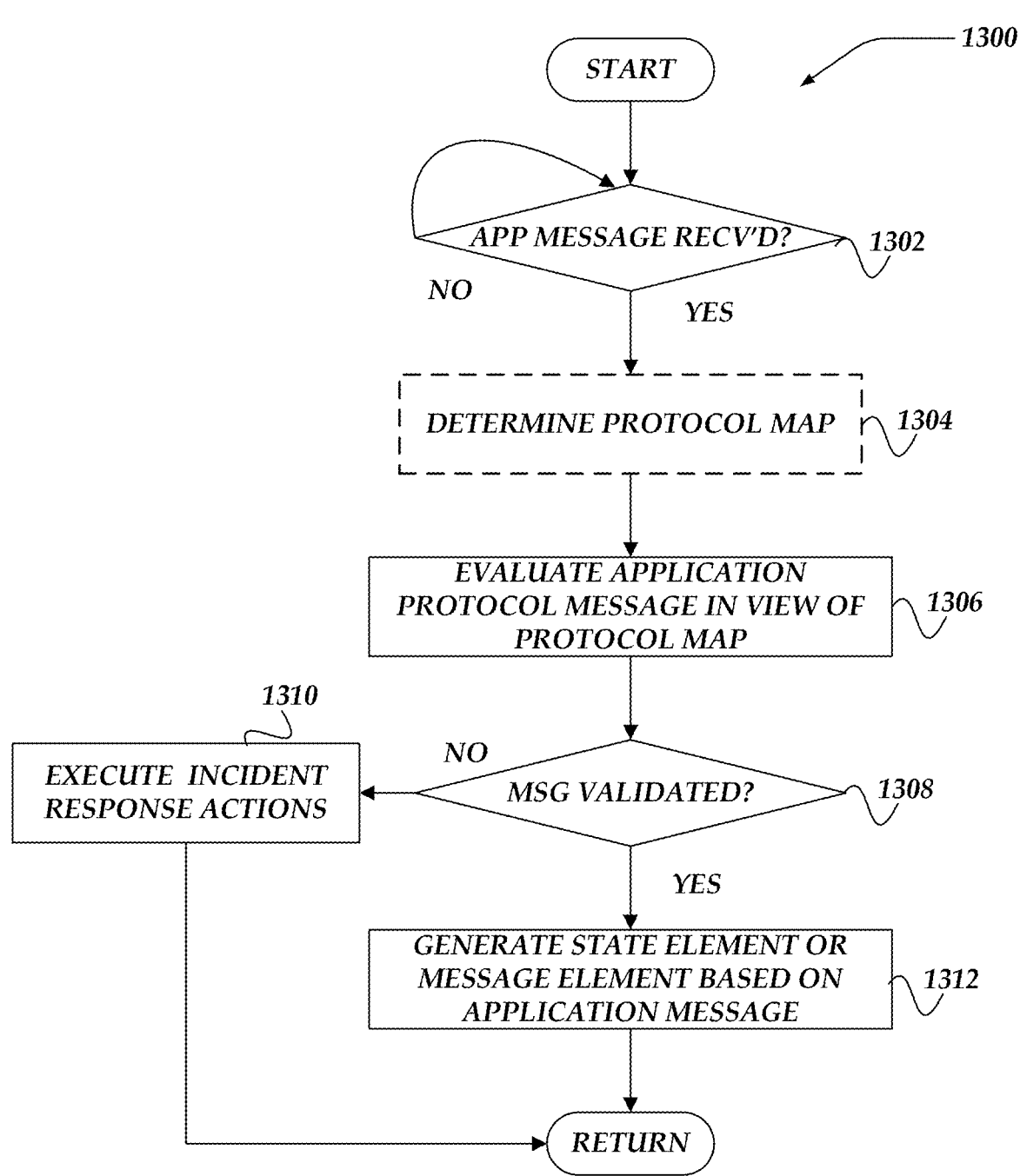
FIG. 13 illustrates a flowchart of a process for employing protocol maps for fine-grained security policy enforcement for applications in accordance with one or more of the various embodiments.

FIG. 13 illustrates a flowchart of process 1300 for employing protocol maps for fine-grained security policy enforcement for applications in accordance with one or more of the various embodiments. After a start block, at decision block 1302, in one or more of the various embodiments, if an application protocol may be provided to a flow engine, control may transfer to block 1304; otherwise, control may loop back to decision block 1302. As described above, flow engines may be provided application protocol messages that may originate from client applications or application servers.

At block 1304, in one or more of the various embodiments, optionally, flow engines may be arranged to determine a protocol map associated with the application protocol message. As described above, in some embodiments, protocol maps may be configured for various application protocols that may be supported by flow engines.

In some embodiments, flow engines or infrastructure security computers may be arranged to associate one or more particular protocol maps with one or more application protocols. In some embodiments, the authorization process of the infrastructure security computer may include providing the protocol map (or reference thereto) to the flow engine.

Also, in some embodiments, flow engines may be arranged to determine the protocol map based on the application session information which may include application name, application version, or the like. In some cases, for some embodiments, overlay network policies may pin a particular application protocol version to a particular session to restrict dynamic application protocol version downgrades, or the like, that may be requested by clients or application servers.

Also, in some embodiments, overlay network policies may associate particular protocol maps to particular users, applications, networks, or the like. Accordingly, in some embodiments, customized protocol maps may be assigned to particular users, user roles, locations, applications, or the like.

Note, this block is indicated as being optional because in some cases, flow engines may have previously determined the protocol map based on previously application protocol messages. Also, in some embodiments, infrastructure security computer may indicate the appropriate protocol map as part of authorizing the communication.

At block 1306, in one or more of the various embodiments, flow engines may be arranged to evaluate the application protocol message in view of the determined protocol map. In some embodiments, protocol maps may be logically considered to be a state machine that may be used to monitor the state of the application session. Accordingly, in some embodiments, out of order messages may be identified.

Further, in some embodiments, protocol maps may include rules, grammars, or the like, that may be used to validate the provided application protocol messages. Accordingly, in some embodiments, various characteristics of the application protocol messages may be verified to include the correct fields, formats, or the like, for the application protocol being used for the application session.

Accordingly, in some embodiments, flow engines may be arranged to employ protocol maps to evaluate various characteristics of the application protocol message, including, order received, fields, field values, length, session identifiers, sequence numbers, or the like.

In some embodiments, flow engines may be arranged to be adaptable to various standard or custom application protocols. Accordingly, in some embodiments, flow engines may be arranged to load protocol maps from configuration information to account for local requirements or local circumstances. In some embodiments, that absence of a suitable protocol maps may prevent the initiation of an application session.

At decision block 1308, in one or more of the various embodiments, if the application protocol message may be validated, control may transfer to block 1312; otherwise, control may transfer to block 1310.

At block 1310, in one or more of the various embodiments, flow engines may be arranged to execute one or more incident responses actions. In some embodiments, flow engines may be arranged to take various actions in response to invalid application protocol messages depending on the overlay network policy. In some cases, for some embodiments, various actions may include one or more of canceling the application session, dropping the invalid messages, raising notifications, generating log entries, alerting security teams, or the like, or combination thereof.

Next, in one or more of the various embodiments, control may be returned to a calling process.

At block 1312, in one or more of the various embodiments, flow engines may be arranged to generate a state element or message element based on the application protocol message.

As described above, in some embodiments, flow engines may be arranged to generate state elements for application protocol messages coming from clients or generate message elements for application protocol messages coming from application servers. Accordingly, in some embodiments, flow engines may be arranged to enqueue the state element in the state queue for the application session or enqueue the message element in the message queue for the application session.

Next, in one or more of the various embodiments, control may be returned to a calling process.

It will be understood that each block of the flowchart illustrations or combinations of blocks in these flowchart illustrations, may be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing interactions with applications in a computing environment using one or more processors that are configured to execute instructions that cause performance of actions, comprising:

obtaining one or more message elements based on one or more application responses to one or more application requests, wherein the one or more message elements are enqueued in a message queue to reduce memory consumption associated with an application session;

using one or more overlay network policy instructions associated with the application session to enable modification of the one or more application responses;

collecting a portion of one or more state elements in a state queue that are associated with the one or more message elements based on an association between the portion of the one or more state elements and the one or more message elements, wherein the one or more state elements are queued in the state queue to reduce memory consumption that is associated with the application session; and updating the portion of the one or more state elements to advance a state of one or more protocols based on the one or more message elements that are associated with the portion of the one or more state elements, wherein the one or more application responses are communicated to a client.

2. The method of claim 1, further comprising:

obtaining the one or more state elements based on one or more application requests from the client, wherein the one or more state elements each include information associated with the one or more application requests or an application server that is a target of the one or more application requests.

3. The method of claim 1, wherein the advancement of the state of the one or more protocols further comprises:

employing one or more protocol maps to validate the one or more protocols based one or more of a rule, an instruction, or a state map associated with one or more security policies.

4. The method of claim 1, wherein the update further comprises removal of the portion of the one or more state elements from the state queue and removal of the one or more message elements from the message queue.

5. The method of claim 1, further comprising:

validating a sequence of the one or more application requests and another sequence of the one or more application responses that conform to a protocol;

validating content of the one or more application requests and other content of the one or more application responses conforms to the protocol; and employing a failure to validate the one or more application requests or another failure to validate the one or more application responses to terminate an application session.

6. The method of claim 1, wherein the collection of the portion of the one or more state elements in the state queue, further comprises:

collecting one or more features of a protocol that associates an application response with an application request, wherein the one or more features include one or more of a sequence number, a timestamp, the client identity, or a network address; and collecting the association between the portion of the one or more state elements and the one or more message elements based on the one or more features of the protocol.

7. The method of claim 1, wherein the obtainment of the one or more message elements further comprises:

employing an overlay network policy to collect one or more policy instructions associated with an application session; and modifying the one or more application responses based on the one or more policy instructions.

8. A network computer for managing interactions with applications, comprising:

a memory that stores at least instructions; and one or more processors that execute instructions that are configured to cause actions, including:

obtaining one or more message elements based on one or more application responses to one or more application requests, wherein the one or more message elements are enqueued in a message queue to reduce memory consumption associated in an application session;

collecting a portion of one or more state elements in a state queue that are associated with the one or more message elements based on an association between the portion of the one or more state elements and the one or more message elements, wherein the one or more state elements are queued in the state queue to reduce memory consumption that is associated with the application session; and updating the portion of the one or more state elements to advance a state of one or more protocols based on the one or more message elements that are associated with the portion of the one or more state elements, wherein the one or more application responses are communicated to a client.

9. The network computer of claim 8, further comprising:

obtaining the one or more state elements based on one or more application requests from the client, wherein the one or more state elements each include information associated with the one or more application requests or an application server that is a target of the one or more application requests.

10. The network computer of claim 8, wherein the advancement of the state of the one or more protocols further comprises:

employing one or more protocol maps to validate the one or more protocols based one or more of a rule, an instruction, or a state map associated with one or more security policies.

11. The network computer of claim 8, wherein the update further comprises removal of the portion of the one or more state elements from the state queue and removal of the one or more message elements from the message queue.

12. The network computer of claim 8, further comprising:

validating a sequence of the one or more application requests and another sequence of the one or more application responses that conform to a protocol;

validating content of the one or more application requests and other content of the one or more application responses conforms to the protocol; and employing a failure to validate the one or more application requests or another failure to validate the one or more application responses to terminate an application session.

13. The network computer of claim 8, wherein the collection of the portion of the one or more state elements in the state queue, further comprises:

collecting one or more features of a protocol that associates an application response with an application request, wherein the one or more features include one or more of a sequence number, a timestamp, the client identity, or a network address; and collecting the association between the portion of the one or more state elements and the one or more message elements based on the one or more features of the protocol.

14. The network computer of claim 8, wherein the obtainment of the one or more message elements further comprises:

employing an overlay network policy to obtain one or more policy instructions associated with an application session; and modifying the one or more application responses based on the one or more policy instructions.

15. A processor readable non-transitory storage media that includes instructions configured for managing interactions with applications in a computing environment, wherein execution of the instructions by one or more processors on one or more network computers causes performance of actions, comprising:

obtaining one or more message elements based on one or more application responses to one or more application requests, wherein the one or more message elements are enqueued in a message queue to reduce memory consumption associated in an application session;

collecting a portion of one or more state elements in a state queue that are associated with the one or more message elements based on an association between the portion of the one or more state elements and the one or more message elements, wherein the one or more state elements are queued in the state queue to reduce memory consumption that is associated with the application session; and updating the portion of the one or more state elements to advance a state of one or more protocols based on the one or more message elements that are associated with the portion of the one or more state elements, wherein the one or more application responses are communicated to a client.

16. The processor readable non-transitory storage media of claim 15, wherein the execution of the instructions causes performance of other actions, further comprising:

obtaining the one or more state elements based on one or more application requests from the client, wherein the one or more state elements each include information associated with the one or more application requests or an application server that is a target of the one or more application requests.

17. The processor readable non-transitory storage media of claim 15, wherein the advancement of the state of the one or more protocols further comprises:

employing one or more protocol maps to validate the one or more protocols based one or more of a rule, an instruction, or a state map associated with one or more security policies.

18. The processor readable non-transitory storage media of claim 15, wherein the update further comprises removal of the portion of the one or more state elements from the state queue and removal of the one or more message elements from the message queue.

19. The processor readable non-transitory storage media of claim 15, wherein the execution of the instructions causes performance of other actions, further comprising:

validating a sequence of the one or more application requests and another sequence of the one or more application responses that conform to a protocol;

validating content of the one or more application requests and other content of the one or more application responses conforms to the protocol; and employing a failure to validate the one or more application requests or another failure to validate the one or more application responses to terminate an application session.

20. The processor readable non-transitory storage media of claim 15, wherein the collection of the portion of the one or more state elements in the state queue, further comprises:

obtaining one or more features of a protocol that associates an application response with an application request, wherein the one or more features include one or more of a sequence number, a timestamp, the client identity, or a network address; and collecting the association between the portion of the one or more state elements and the one or more message elements based on the one or more features of the protocol.

\* \* \* \* \*